United States Patent
Katikaneni et al.

(10) Patent No.: US 8,999,590 B2
(45) Date of Patent: Apr. 7, 2015

(54) ON-LINE MONITORING ASSEMBLY FOR DETECTION OF SULFUR BREAKTHROUGH IN A DESULFURIZER ASSEMBLY AND SULFUR BREAKTHROUGH DETECTION METHOD

(75) Inventors: Sai P. Katikaneni, Dhahran (SA); Joseph M. Daly, Bethel, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1475 days.

(21) Appl. No.: 11/782,989

(22) Filed: Jul. 25, 2007

(65) Prior Publication Data

US 2009/0029208 A1  Jan. 29, 2009

(51) Int. Cl.
*H01M 8/06* (2006.01)
*H01M 8/04* (2006.01)

(52) U.S. Cl.
CPC ...... *H01M 8/04447* (2013.01); *H01M 8/04753* (2013.01); *H01M 8/0675* (2013.01); *Y02E 60/50* (2013.01)

(58) Field of Classification Search
CPC .................................................. H01M 8/0675
USPC .............................. 429/400–535; 422/86, 87; 436/119–123; 205/786.5; 356/344, 356/432–444; 208/208 R–217
See application file for complete search history.

(56) References Cited

U.S. PATENT DOCUMENTS 6,824,573 B2  11/2004  Saitou et al.
7,063,732 B2   6/2006  Katikaneni et al.
2002/0043154 A1 * 4/2002  Shore ............................... 95/135
2002/0150806 A1  10/2002  Stenersen et al.
2003/0068264 A1 * 4/2003  Schmidt et al. ................ 423/237
2005/0022449 A1 * 2/2005  Katikaneni et al. .......... 48/198.3
2005/0095698 A1 * 5/2005  Carlson ...................... 435/287.2

(Continued)

FOREIGN PATENT DOCUMENTS

JP  2005-043186 A  * 2/2005  ............. B01D 15/00
JP  2006-202564 A  * 8/2006  ................ C01B 3/38
WO  WO 2004-030814   4/2004

OTHER PUBLICATIONS

Takatsu et al. JP 2006-202564 A. Aug. 3, 2006. English machine translation provided by JPO.*

(Continued)

*Primary Examiner* — Kenneth Douyette
*Assistant Examiner* — James Lee
(74) *Attorney, Agent, or Firm* — Cowan, Liebowitz & Latman, P.C.

(57) ABSTRACT

A monitoring assembly for use in a fuel cell system for detecting sulfur-containing compounds in fuel. The monitoring assembly comprises an indicator assembly for passing the fuel therethrough, the indicator assembly including an indicator material and a housing for housing said indicator material, wherein the housing is adapted to be placed on-line in one of a main path receiving substantially all the fuel and a bypass path receiving only a portion of the fuel in the fuel cell system and the indicator material is such that when the housing is placed on-line in the fuel cell system at least one physical property of the indicator material changes when the indicator material is exposed to sulfur-containing compounds in the fuel of the fuel cell system, and the indicator assembly being additionally adapted to allow detection of the change in the physical property of the indicator material.

33 Claims, 6 Drawing Sheets

(56) References Cited

U.S. PATENT DOCUMENTS

2006/0169639 A1    8/2006  Duraiswamy et al.
2006/0286423 A1*  12/2006  Black ............................. 429/30

OTHER PUBLICATIONS

Matsuda et al. JP 2005-043186 A. Feb. 17, 2005. English machine translation provided by JPO.*
Cognex, Product Guide 2007, In-Sight Vision Sensors.
Cognex In-Sight Hardware Specifications, In-Sight 5000, 5100, 5400, 5400S, 5400C, 5401, and 5403.
Sensidyne Fixed Gas Detection & Air Monitoring Systems, Detector Tubes, www.sensidyne.com/prodgroup.php?ID=1, printed on Dec. 4, 2006.
Sensidyne Fixed Gas Detection & Air Monitoring Systems. Gas Detector Tubes, www.sensidyne.com/gas_detector_tubes.php, printed on Dec. 4, 2006.
Sensidyne Gas Detector Tube Handbook, http://209.18.104.171/uploads/docLib_918_Detector%20Tube%20Handbook%2011%202005.pdf , printed on Dec. 4, 2006.
Sulfur Measurement Handbook, Galvanic Applied Sciences, Inc.
Girish Srinivas, et al., Hybrid Sulfur Recovery Process for Natural Gas Upgrading Quarterly Technical Report, CrystaTech, Inc., and TDA Research, Inc., Jul. 2002.
Gas Chromatography Laboratory, Gas Chromatography Testing Expertise, Part I, www.intertek-cb.com/newsitetest/news/gaschromdetect.shtml, printed on Feb. 28, 2006.
Sulfur Chemiluminescense Detection for Gas Chromatography (GC) Analysis, www.ionicinstruments.com/ionics.cfm?category_code=SCD, printed on Feb. 28, 2006.

* cited by examiner

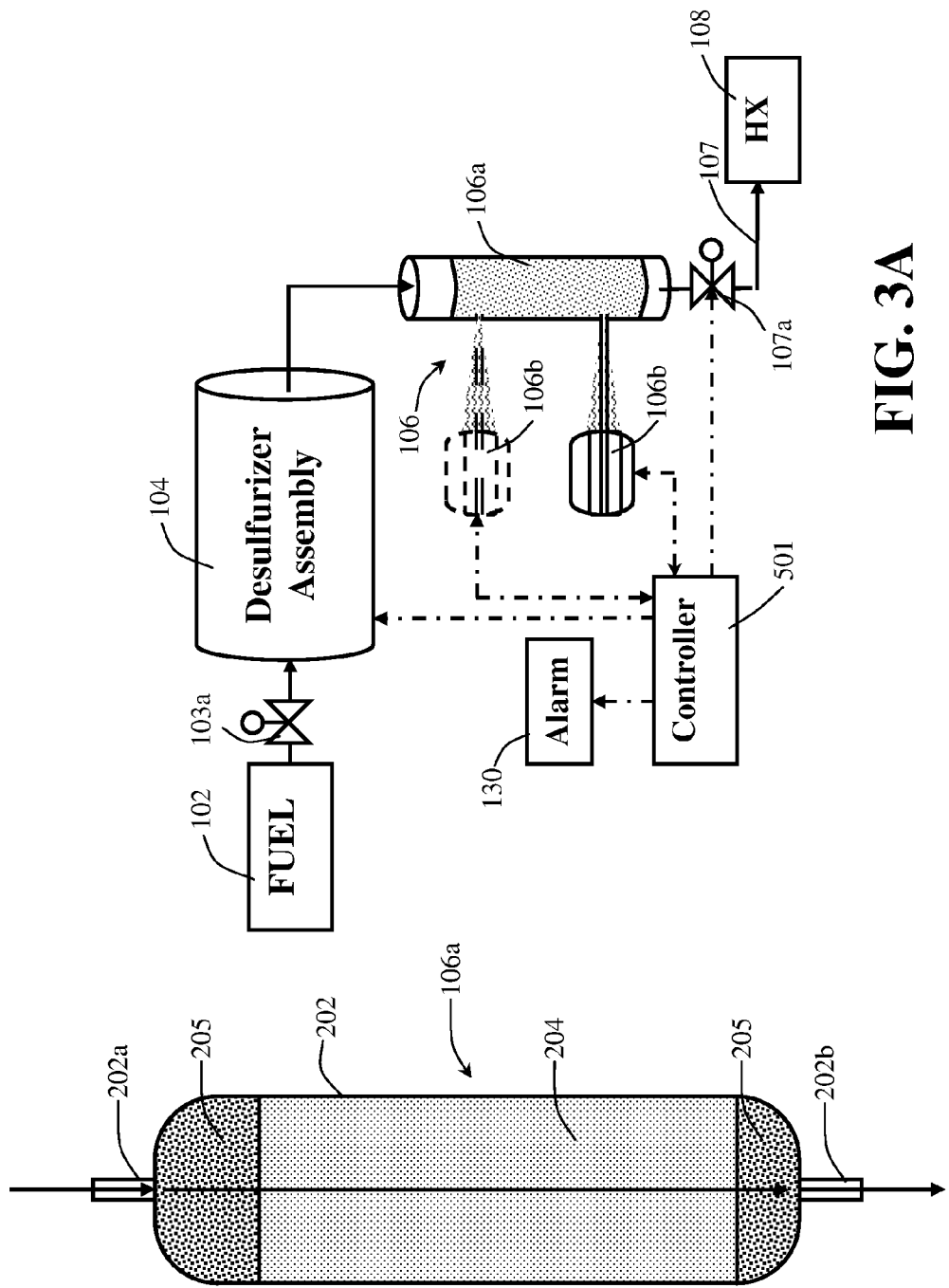

ON-LINE MONITORING ASSEMBLY FOR DETECTION OF SULFUR BREAKTHROUGH IN A DESULFURIZER ASSEMBLY AND SULFUR BREAKTHROUGH DETECTION METHOD

BACKGROUND OF THE INVENTION

This invention relates to fuel cells and, in particular, to detection of sulfur breakthrough in a desulfurizer assembly used with such fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells operate by passing a reactant fuel gas through the anode, while oxidizing gas is passed through the cathode. In order to produce a useful power level, a number of individual fuel cells are stacked in series with an electrically conductive separator plate between each cell.

Current fuel cell technology requires clean fuel gas composed of hydrogen or a mixture of hydrogen and carbon monoxide, which can be generated from hydrocarbon-containing feedstocks such as natural gas, propane, anaerobic digester gas, petroleum-based liquids or coal through a reforming process. Most hydrocarbon-containing feedstocks contain sulfur, which causes reforming and anode catalyst poisoning and is known to significantly diminish the performance of fuel cell anodes and reforming catalysts. Therefore, prior to the reforming process, sulfur and sulfur-containing compounds have to be removed from the fuel gas to a part per billion level before the fuel gas enters the fuel cell.

The present state of the art employs a fuel processing assembly, such as a desulfurizer assembly, that includes at least one adsorption bed for removal of sulfur-containing compounds from the fuel gas before passing the fuel gas to the fuel cell anode. An example of such a fuel processing assembly is disclosed in U.S. Pat. No. 7,063,732, which is assigned to the same assignee herein. In particular, the '732 patent discloses a fuel processing system for processing fuel for a fuel cell including a first adsorbent bed for adsorption of inorganic sulfur-containing compounds and high molecular weight organic sulfur-containing compounds and a second adsorbent bed for adsorption of low molecular weight organic sulfur-containing compounds, wherein the adsorbent beds are arranged such that the fuel to be processed passes through one of the adsorbent beds and thereafter through the other of the adsorbent beds.

As can be appreciated, the adsorbent capacity and performance of the adsorbent bed used in the fuel processing system declines with operating time as the adsorbent bed becomes more saturated with sulfur-containing compounds. As a result, sulfur breakthrough occurs when the adsorbent bed becomes unable to decrease the concentration of the sulfur-containing compounds in the fuel to a desired level, normally expressed in parts per billion by volume (ppbv), and the amount of sulfur-containing compounds passing through the bed without being adsorbed, i.e. sulfur breakthrough concentration, increases as the saturation level of the sulfur-containing compounds in the bed is achieved. When a predetermined sulfur breakthrough concentration in the processed fuel is reached, the adsorbent bed has to be replaced or regenerated to avoid sulfur poisoning of the fuel cell system components. Due to variable concentrations of sulfur-containing compounds in the fuel gas, the time when the predetermined level of sulfur breakthrough is reached can be highly variable. Therefore in order to ensure timely replacement or regeneration of the adsorbent bed, monitoring of the sulfur breakthrough concentration in the processed fuel is required.

Presently, the monitoring of the sulfur breakthrough concentration is accomplished by intermittently analyzing samples of processed fuel gas leaving the fuel processing assembly using conventional gas chromatography techniques. Commonly used techniques for analyzing the sulfur concentration in the processed fuel include Gas Chromatography (GC) in conjunction with Sulfur Chemiluminescence Detection (GC-SCD) or Flame Photometric Detection (GC-FPD) techniques. However, these conventional techniques are expensive, thus substantially increasing the fuel processing costs and the operating costs of the fuel cell system. Moreover, the conventional monitoring methods require sampling of the processed fuel and therefore, require additional personnel and additional analytical equipment for sample collection, transportation from the field to a laboratory and performing the analysis of the processed fuel samples. As a result, the conventional methods cannot be integrated with the fuel cell processing assembly so as to continuously monitor the breakthrough sulfur concentration online.

It is therefore an object of the invention to provide a sulfur breakthrough monitoring assembly and method for use with the fuel processing system which is able to continuously monitor for sulfur breakthrough concentration on-line.

It is a further object of the invention to provide a sulfur breakthrough monitoring assembly and method which is integrated with the fuel processing system so as to continuously monitor for sulfur breakthrough concentration online, without requirement of sampling the processed fuel for analysis by outside analytical equipment.

It is a further object of the invention to provide a sulfur breakthrough monitoring assembly and method which is highly accurate in detection of sulfur breakthrough and is cost effective.

SUMMARY OF THE INVENTION

The above and other objectives are realized in a monitoring assembly for use in a fuel cell system for detecting sulfur-containing compounds in fuel, the monitoring assembly comprising an indicator assembly for passing the fuel therethrough, the indicator assembly including an indicator material and a housing for housing the indicator material, wherein the housing is adapted to be placed on-line in the fuel cell system and the indicator material is such that when the housing is placed on-line in the fuel cell system at least one physical property of the indicator material changes when the indicator material is exposed to sulfur-containing compounds in the fuel of the fuel cell system, and the indicator assembly being additionally adapted to allow detection of the change in the physical property of the indicator material.

In certain embodiments, the adaptation of the indicator assembly allows for detection of the change in physical property of the indicator material by an operator and/or via a sensor. Based on the detected change in the physical property, if it is determined that a predetermined concentration of sulfur-containing compounds is present in the fuel, then a predetermined action can be taken. One predetermined action performed can be activating an alarm either by the operator or through a controller of the fuel cell system responsive to the sensor.

In the illustrative embodiments described, the physical property of the indicator material includes a color of the indicator material, and the predetermined concentration of the sulfur-containing compounds corresponds to a predetermined color of the indicator material. In such embodiments, at least a portion of the housing comprises transparent material so as to permit detection by a human operator, either directly or remotely through use of a camera, such as a web cam, or stored digital photos, or detection by a sensor of the color of the indicator material. The indicator material can be one of FSK-A adsorbent, AG400 adsorbent, TOSPIX 94 adsorbent, titanium silicate zeolite, F8-01 (Desulf-2) adsorbent, Selectra® Sulf-X CNG-2 adsorbent and SulfaTrap™-R6 adsorbent, and may also be adapted to remove the sulfur-containing compounds from the fuel. In the illustrative examples described herein, the predetermined concentration of sulfur-containing compounds in the fuel is 30 ppbv or more.

In certain embodiments, the monitoring assembly further comprises a sensor assembly for detecting the physical property of the indicator material or detecting a change in the physical property of the indicator assembly, and the controller of the fuel cell system determines, based on the detecting by the sensor assembly, whether the predetermined concentration of sulfur-containing compounds is present in the fuel. In some embodiments, the sensor assembly includes a plurality of sensors disposed along a length of the housing of the indicator assembly. In such cases, the controller of the fuel cell system determines, based on the detecting by the plurality of sensors, a rate of progression of the change in physical property along the length of the housing, and based on this rate of progression, further determines with greater precision whether the predetermined concentration of sulfur-containing compounds is present in the fuel.

In some illustrative embodiments, the monitoring assembly comprises an image capture device, such as a camera or a web cam, for capturing images showing the physical property of the indicator material at predetermined intervals, and the human operator determines, based on the images captured by the image capture device, whether the predetermined concentration of sulfur-containing compounds is present in the fuel. In certain embodiments, the image capture device is a Cognex ⅓" CCD camera, model no. 5100C, with an integrated LED light ring. The images captured by the image capture device are remotely accessed and reviewed by the operator, who determines whether the predetermined concentration of sulfur-containing compounds is present based on the change in the physical property shown in the images. In some embodiments, the controller of the fuel cell activates an alarm to notify the operator when the images are ready for the operator's review.

In some illustrative embodiments, the monitoring assembly is used for detecting sulfur-containing compounds in the fuel after passing the fuel through a desulfurizer assembly. The desulfurizer assembly comprises a plurality of fuel flow control members for controlling fuel flow through the desulfurizer assembly. In certain embodiments, the desulfurizer assembly includes at least a first desulfurizer and a second desulfurizer coupled in parallel, and the plurality of fuel flow control members control the flow of fuel through the first and second desulfurizers such that the fuel passes through one of the first and second desulfurizers while the other of the first and second desulfurizers is in standby mode. In such cases, if it is determined that the predetermined concentration of sulfur-containing compounds is present in the fuel leaving the desulfurizer assembly, the controller of the fuel cell system performs at least one of activating an alarm and controlling the plurality of fuel flow control members to inhibit the flow of fuel through the one of the first and second desulfurizers and to pass the fuel through the other of the first and second desulfurizers. In certain embodiments, if the operator determines that the predetermined concentration of sulfur-containing compounds is present in the fuel leaving the desulfurizer assembly, the operator performs remotely at least one of activating an alarm and controlling the plurality of fuel flow control members to inhibit the flow of fuel through the one of the first and second desulfurizers and to pass the fuel through the other of the first and second desulfurizers.

In some embodiments, the fuel cell system comprises a fuel cell and a fuel supply control member downstream from the monitoring assembly. The fuel supply control member controls flow of the fuel to the fuel cell, and when it is determined that the predetermined concentration of sulfur-containing compounds is present in the fuel, the controller of the fuel cell system performs at least one of activating an alarm and controlling the fuel supply control member to minimize or altogether inhibit the flow of fuel to the fuel cell. In cases where an operator determines whether the predetermined concentration of sulfur-containing compounds is present in the fuel, the operator can perform remotely at least one of activating an alarm and controlling the fuel supply control member to minimize or altogether inhibit the flow of fuel to the fuel cell.

A monitoring assembly that includes a plurality of indicator assemblies and a plurality of sensor assemblies corresponding to the indicator assemblies is also described. In this monitoring assembly, the indicator assemblies are connected in parallel and/or in series with one another.

A fuel cell system using the monitoring assembly for detecting sulfur-containing compounds in desulfurized fuel leaving the desulfurizer assembly and a method of detecting sulfur-containing compounds in fuel, are also described.

Furthermore, a desulfurizer-indicator assembly for use in the fuel cell system for removing sulfur-containing compounds from fuel and for monitoring sulfur-containing compounds in the fuel is described. The desulfurizer-indicator assembly includes at least one desulfurizer unit including desulfurizer material comprising one of adsorbent and absorbent for removing sulfur-containing compounds from the fuel and indicator material, wherein at least one physical property of the indicator material changes when the indicator material is exposed to sulfur-containing compounds. The desulfurizer material and the indicator material are housed by a housing such that the fuel is first passed through one of the desulfurizer material and the indicator material and thereafter passed through the other of the desulfurizer material and the indicator material.

The housing is adapted to be placed on-line in the fuel cell system and the indicator material is such that when the housing is placed on-line in the fuel cell system at least one physical property of the indicator material changes when the indicator material is exposed to sulfur-containing compounds in the fuel of the fuel cell system, and the desulfurizer-indicator assembly is additionally adapted to allow detection of the change in the physical property of the indicator material. An operator or a controller of the fuel cell system perform a predetermined action, if it is determined, based on a detected change in at least one physical property of the indicator material, that a predetermined concentration of sulfur-containing compounds is present in the fuel.

BRIEF DESCRIPTION OF THE DRAWINGS

The above and other features and aspects of the present invention will become more apparent upon reading the following detailed description in conjunction with the accompanying drawings, in which:

FIG. 2 shows a schematic view of an illustrative example of an indicator assembly of FIG. 1;

FIG. 3A shows a schematic view of one embodiment of the monitoring assembly of FIG. 1;

DETAILED DESCRIPTION

Figure 1:
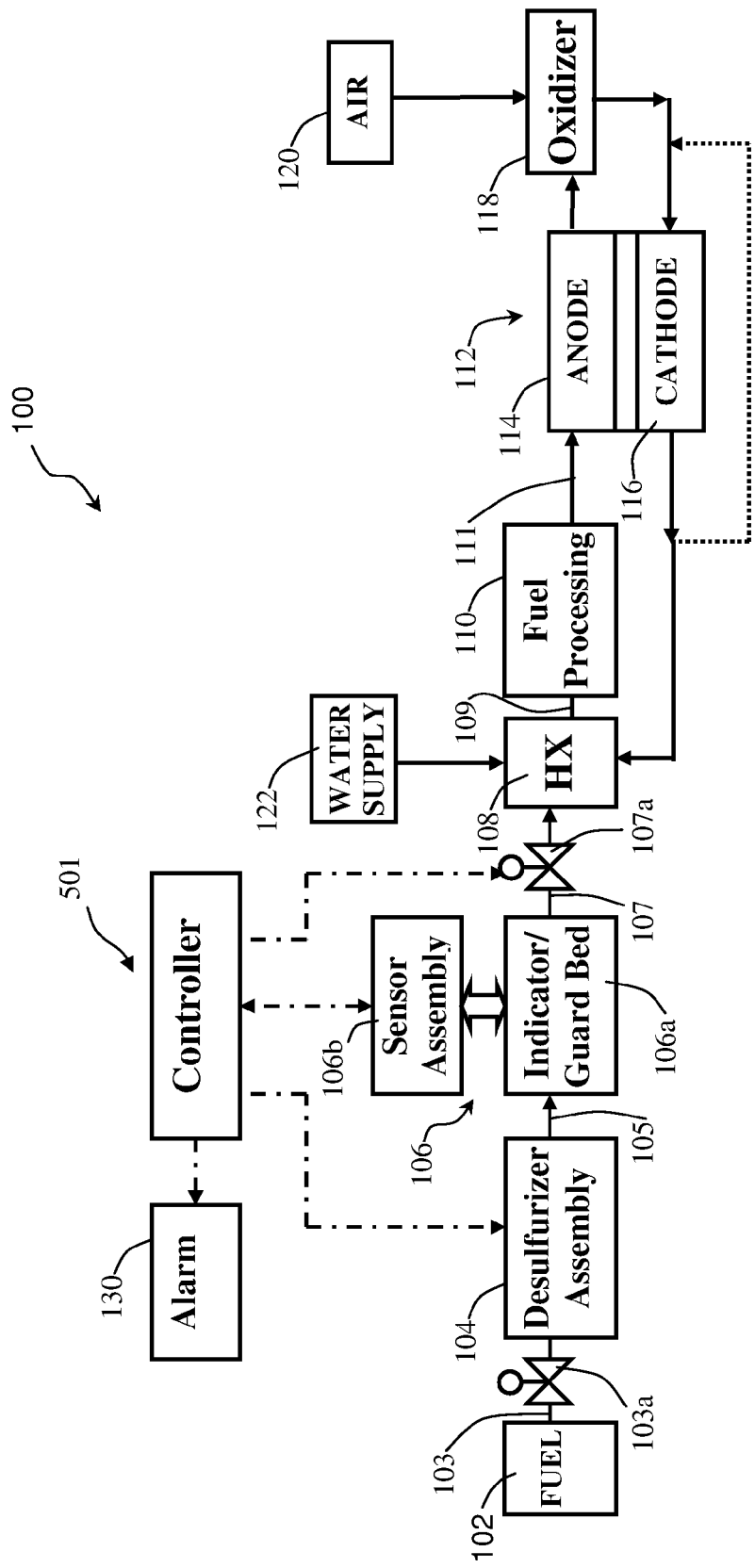
FIG. 1 shows a fuel cell system employing a monitoring assembly for detecting breakthrough concentration of sulfur downstream of a desulfurizer assembly.

FIG. 1 illustrates a fuel cell system 100 which includes a desulfurizer assembly 104 and a monitoring assembly 106 for detecting breakthrough concentration of sulfur downstream from the desulfurizer assembly 104. The fuel cell system 100 is supplied with fuel from a fuel supply 102 connected to the desulfurizer assembly 104 by a connecting line 103. A first flow control member 103a, such as a flow control valve, is used to control the flow of fuel from the fuel supply 102 to the desulfurizer assembly 104.

The desulfurizer assembly 104 includes one or more desulfurizers each of which includes one or more adsorbent and/or absorbent beds comprising adsorbent and/or absorbent materials. Sulfur-containing compounds present in the fuel being passed through the desulfurizer assembly 104 are removed from the fuel using the adsorbent and/or absorbent beds by chemical or physical adsorption or by absorption. Desulfurized fuel from the desulfurizer assembly 104 is thereafter passed through a connecting line 105 to the monitoring assembly 106 which continuously monitors the desulfurized fuel for the presence of sulfur-containing compounds therein, i.e., sulfur breakthrough, and/or detects the concentration of the sulfur-containing compounds in the desulfurized fuel, i.e., sulfur breakthrough concentration.

As shown in FIG. 1, the monitoring assembly 106 comprises an indicator assembly 106a through which the desulfurized fuel is passed and a sensor assembly 106b, which senses and detects a physical change in the indicator material caused by the sulfur breakthrough and/or sulfur breakthrough concentration in the desulfurized fuel passing through the indicator assembly 106a. The indicator assembly 106a includes indicator material which may also function as a guard bed to further desulfurize the fuel by removing any sulfur compounds present in the fuel. A construction of the indicator assembly 106a, as well as an illustrative configuration of the monitoring assembly 106 being used with the desulfurizer assembly 104, will be described in more detail herein below.

As shown in FIG. 1, the fuel cell system 100 also includes a controller 501 for controlling at least the sensor assembly 106b of the monitoring assembly 106 and the desulfurizer assembly 104. As described in more detail herein below, the controller 501 determines, based on the detected sulfur breakthrough and/or sulfur breakthrough concentration by the sensor assembly 106b, whether a predetermined sulfur breakthrough or sulfur breakthrough concentration is present in the desulfurized fuel, and controls the fuel cell system to perform at least one predetermined action. As discussed in more detail herein below, the predetermined actions include activation of a signal, such as an alarm 130, indicating a need for replacement or regeneration of at least one desulfurizer of the desulfurizer assembly 104, controlling the desulfurizer assembly 104 to inhibit flow of fuel through an operating desulfurizer and to redirect fuel flow through another desulfurizer, and controlling the flow of desulfurized fuel to the fuel cell so as to minimize or altogether inhibit the flow of fuel to the fuel cell.

In the illustrative examples described herein and the discussion to follow, it will be assumed that the concentration of sulfur-containing compounds in the fuel is being monitored by the assembly 106, i.e., the sulfur breakthrough concentration is being detected. However, the description and discussion to follow applies equally well to the case in which the sulfur content is being monitored, i.e., the sulfur breakthrough is being monitored but has not occurred. Also, in the examples disclosed, the predetermined breakthrough sulfur concentration is 30 ppbv or higher, and in particular between 30 ppbv and 200 ppbv. It is further noted that in certain embodiments the controller 501 includes a monitoring assembly controller for controlling the monitoring assembly 106. In such case, the monitoring assembly controller determines whether the predetermined sulfur breakthrough concentration of sulfur-containing compounds is present in the desulfurized fuel.

In certain embodiments, the desulfurizer assembly 104 includes a plurality of desulfurizers, each of the desulfurizers including at least one desulfurizing bed, wherein the desulfurizers are coupled with one another so as to allow at least one of the desulfurizers to be operational while one or more of the other desulfurizers are in standby mode. An example of such desulfurizer assembly, which includes a "lead lag" system, is disclosed in commonly assigned U.S. Pat. No. 7,063,732, which is hereby incorporated by reference. As discussed in the '732 patent, the desulfurizer assembly in such embodiments includes one or more fuel flow control members (not shown for purpose of simplicity) to direct the flow of fuel through at least one of the desulfurizers.

In particular, when the controller 501 determines, based on the sulfur breakthrough concentration detected by the sensor assembly 106b, that the predetermined sulfur breakthrough concentration is present in the fuel, the controller 501 controls the fuel flow control members of desulfurizer assembly 104 to inhibit or limit the flow of fuel through the operational desulfurizer and to direct the flow of fuel through at least one of the other desulfurizers on standby. The controller 501 may also activate a signal, such as an alarm, indicating a need for replacement or regeneration of the previously operational desulfurizer. In certain embodiments, the controller 501 also controls the desulfurizer assembly 104 to automatically regenerate the previously operational desulfurizer by regenerating the adsorbent materials in the desulfurizer when the fuel flow through the previously operational desulfurizer is inhibited or if the signal indicating that the previously operational desulfurizer needs to be regenerated is activated.

As illustrated in FIG. 1, the fuel cell system 100 also includes a second flow control member 107a for controlling the flow of desulfurized fuel to the fuel cell 112. In some illustrative embodiments, the controller 501 controls the second flow control member 107a to control the flow rate of fuel to the fuel cell 112. In such embodiments, when the controller 501 determines, based on the sulfur breakthrough concentration detected by the sensor assembly 106b, that the predetermined sulfur breakthrough concentration is present in the fuel, the controller 501 controls the second fuel flow control member 107a to inhibit or limit the flow of desulfurized fuel. In certain embodiments, the controller 501 first activates an alarm 130 when it is determined that the predetermined sulfur breakthrough concentration is present in the fuel, and thereafter controls the second fuel flow control member 107a to inhibit or limit the flow of fuel therethrough if the alarm is not de-activated within a predetermined time period.

As shown in FIG. 1, the system 100 also includes a heat exchanger 108 downstream from the second fuel flow control member 107a, for pre-heating and humidifying the desulfurized fuel, a fuel processing assembly 110 for further processing the fuel, a fuel cell 112, including an anode 114 and a cathode 116, and an oxidizer assembly 118. As shown, desulfurized fuel, after passing through the indicator assembly 106a and the second fuel flow control member 107a, is passed to the heat exchanger 108 through a connecting line 107. In the heat exchanger, the fuel is combined with water from a water supply 122 and heated to a predetermined temperature to produce heated humidified fuel. The heated humidified fuel is passed from the heat exchanger 108 to the fuel processing assembly 110 via a connecting line 109 to undergo further processing. The processing assembly 110 may include a pre-reforming assembly for reforming at least a portion of the heated humidified fuel to produce fuel suitable for use in the fuel cell 112.

Fuel processed in the fuel processing assembly 110 is thereafter conveyed via a connecting line 111 to the anode 114 of the fuel cell 112, where it undergoes an electrochemical reaction with an oxidant gas flowing through the cathode 116 to produce electrical power. As also shown, spent fuel leaving the anode 114, i.e. anode exhaust, which includes unreacted fuel, is conveyed to the oxidizer 118 where it is combined with air from an air supply 120 and combusted to produce oxidant gas suitable for use in the cathode 116. Spent oxidant gas leaving the cathode 116, in turn, may be passed to the heat exchanger 108 for heating desulfurized fuel and water and/or may be recycled back to the cathode 116.

FIG. 2 shows a detailed schematic view of an illustrative embodiment of the indicator assembly 106a of FIG. 1. As shown, the indicator assembly 106a includes a housing 202 having an inlet 202a and an outlet 202b which are adapted to allow the indicator assembly to be placed on-line in the fuel cell system 100. Typically, the inlet and outlet 202a and 202b can be female couplings adapted to mate with male couplings of the adjoining lines of the fuel cell system. The indicator assembly 106a also includes an indicator material 204 housed by the housing 202. In the embodiment shown, the indicator assembly 106a also includes non-reactive material 205, which is disposed in the housing 202 and is used for holding the indicator material 204 in place. The indicator assembly 106a is additionally adapted to allow detection of a change in property of the indicator material 204. In this case shown, this adaptation takes the form of the housing 202 being preferably formed from a transparent or a translucent material, such as quartz, polyvinyl chloride (PVC) plastic, poly methyl methacrylate plastic or other acrylate, or polycarbonate, to allow the indicator material 204 housed therein to be visible when viewed from outside of the housing, thereby allowing detection of a change in a property of the material.

More particularly, the indicator material 204 comprises a material which changes at least one of its physical properties, such as its color, when exposed to sulfur-containing compounds. In the illustrative embodiment shown herein, the indicator material is in powder or bead form and comprises an absorbent or an adsorbent material which changes color when exposed to sulfur-containing compounds. Suitable indicator materials include calorimetric adsorbents, such as FSK-A adsorbent supplied by Tokyo Gas, which gradually changes its color from white to black when exposed to sulfur-containing compounds, Ag400 adsorbent supplied by Molecular C-Chem, which gradually changes its color from beige to dark brown, TOSPIX 94 adsorbent supplied by Tokyo Gas, which gradually changes its color from white to brown, Selectra® Sulf-X CNG-2 adsorbent manufactured by Engelhard (recently acquired by BASF), which gradually changes its color from light green to dark green, SulfaTrap™-R6 manufactured by TDA Research which gradually changes its color from light blue-green to brown, or F8-01 (Desulf-2) adsorbent manufactured by BASF which gradually changes its color from white with gray speckles to dark gray. In certain embodiments using the F8-01 (Desulf-2) adsorbent as the indicator material 204, the F8-01 (Desulf-2) adsorbent may be used in combination with a Desulf-1 adsorbent, such as F3-01 manufactured by BASF, as the desulfurizer adsorbent material in the desulfurizer. For example, the color of the FSK-A adsorbent material, when exposed to sulfur-containing compounds, gradually changes from white to beige to brown and finally to black, as the concentration of sulfur compounds in the desulfurized fuel increases. The change in the color of the indicator material and/or the rate of color change are thus indicative of and correlated to the different sulfur breakthrough concentrations in the fuel with a predetermined color corresponding to a predetermined sulfur breakthrough concentration. In this way, the sensor assembly 106b of the monitoring assembly detects at least one of the color, a change in the color of the indicator material, and the rate in the color change of the indicator material, and the controller 501 correlates the color, the change in the color and/or the rate in the color change detected by the sensor assembly with the different sulfur breakthrough concentrations and determines whether the predetermined sulfur breakthrough concentration is present.

The non-reactive material 205 comprises material which is stable, non-absorbent and non-adsorbent when exposed to fuel and sulfur-containing compounds. The non-reactive material 205 should be sufficiently permeable so as to allow fuel to pass therethrough. For example, a plurality of glass beads are suitable for use as the non-reactive material 205. As shown in FIG. 2, the non-reactive material 205 is disposed in the housing 202 adjacent the inlet 202a portion of the housing and adjacent the outlet 202b portion of the housing 202, while the indicator material 204 is disposed between the non-reactive material 205 at the inlet and at the outlet of the housing 202, such that the indicator material 204 is sandwiched between and is held in place by the non-reactive material 205. In place of, or in addition to, the non-reactive material 205, a non-reactive support screen assembly, including one or more support screens and/or perforated plates, may be used for holding the indicator material 204 in place in the housing 202. In such embodiments, the non-reactive support screen assembly is formed from polypropylene, stainless steel or other suitable unreactive material.

The dimensions of the housing 202 and the volume of the indicator material 204 in the housing 202 vary based on the configuration of the fuel cell 112 of the fuel cell system and the type of fuel supplied to the fuel cell system. In particular, the desired dimensions of the housing 202, in particular the ratio of the length to the diameter of the housing, and the volume of the indicator material 204 disposed in the housing are optimized so as to eliminate channeling of the fuel through the indicator assembly 106a. The dimensions of the housing and the volume of the indicator material are also optimized so as to allow fuel flow within predetermined superficial velocity and residence time ranges. It is understood that the predetermined superficial velocity and residence time of the fuel flowing through the indicator assembly 106a are dependent on the type of fuel used in the fuel cell system. Moreover, indicator assemblies having different dimensions have been tested, and it has been determined that the change in the color of the indicator material in smaller-sized indicator assemblies occurred more rapidly than in larger-sized assemblies because the sulfur saturation in smaller-sized indicator assemblies increased at a higher rate than in larger-sized indicator assemblies. Accordingly, smaller-sized indicator assemblies are particularly useful in detecting low sulfur breakthrough concentrations with high sensitivity.

Illustrative examples of the of the indicator assembly 106a will now be described.

EXAMPLE 1

In the first illustrative example, the indicator assembly 106a comprises a housing 202 formed from a clear or transparent PVC material having a 10 inch diameter. A standard Schedule 40 clear PVC pipe having a diameter of 10 inches is suitable for use as the housing 202. The cross-sectional area of the housing has an area of about 0.55 $ft^2$, while the length of the housing is about 12 inches. The housing 202 has disposed therein indicator material 204 comprising FSK-A adsorbent, such that the indicator material 204 disposed in the housing 202 has a height of about 12 inches and a volume of about 0.55 $ft^3$. A perforated plate and screen assembly is used as the non-reactive screen assembly disposed near the inlet 202a and near the outlet 202b of the housing and hold the indicator material in place. These dimensions of the indicator assembly 106a are suitable for use with a 300 kW fuel cell system operating on either HD-5 propane fuel or natural gas fuel.

When the fuel cell system operates with HD-5 propane fuel, the desired maximum flow rate of the HD-5 propane fuel through the indicator assembly 106a of this example is about 15 standard cubic feet per minute (scfm) or less, where the cubic feet are related to standard pressure and temperature of 1 atmosphere and 59° F., the desired superficial velocity is 0.46 ft/sec or less and the desired space velocity is 0.46 l/sec or 1644 l/hr or less.

When the fuel cell system operates with natural gas, the desired maximum flow rate of the natural gas fuel through the indicator assembly 106a of this example is about 38-40 scfm, the desired superficial velocity is about 1.22 ft/sec or less and the space velocity is about 1.22 l/sec, or 4400 l/hr, or less. To achieve the higher flow rate when the fuel cell system is operating with natural gas, a housing having a larger diameter than in the system operating on HD-5 propane fuel may be used. For example, a housing 202 formed from a clear or transparent material having a 12 or 16 inch nominal diameter is suitable for use in the system operating on natural gas.

As mentioned above, the dimensions of the housing 202 and the indicator material 204 of the indicator assembly 106a as well as the flow rate, the velocity and residence time of the fuel in the indicator assembly 106a may be varied when the fuel cell system operates on other types of fuel in order to optimize the indicator assembly's performance.

EXAMPLE 2

In the second illustrative example, the indicator assembly 106a comprises a housing 202 formed from a transparent quartz material, and indicator material 204 comprises one of TOSPIX 94, Selectra® Sulf-X CNG-2, Ag400, F8-01 (Desulf-2) and SulfaTrap™-R6 adsorbents. The quartz housing 202 in this example comprises a quartz tube having a diameter between 0.25 and 1.5 inches, and a length between 1 and 10 inches. The indicator material 204 disposed within the housing has a volume between 5 and 300 mL, or between 0.3 and 18.3 $in^3$.

When exposed to the predetermined amount of sulfur-containing compounds, the color of the indicator material 204 changes from one color to another, e.g. from white to yellow if TOSPIX 94 is used as the indicator material. As mentioned herein above, the change in the color of the indicator material 204 and/or the rate of color change are correlated with the concentration of sulfur compounds in the desulfurized fuel. For example, the concentration of sulfur-containing compounds was tested after the color of the indicator material 204 comprising TOSPIX 94 changed from white to yellow, and it was determined that the concentration of sulfur-containing compounds in the tested fuel was greater than 100 ppbv.

The indicator assembly 106a described in the second example is suitable for use in a fuel cell system in which a portion of the desulfurized fuel, rather than all of the desulfurized fuel, from the desulfurizer assembly is passed through the indicator assembly 106a, while the remaining portion of the fuel is passed directly to the heat exchanger 108. In this case, after passing through the indicator assembly 106a, the fuel is combined with the remaining portion of the fuel conveyed directly to the heat exchanger 108. This illustrative embodiment of the fuel cell system will be described in more detail herein below with respect to FIG. 3B.

FIG. 3A shows a schematic view of a first embodiment of the monitoring assembly of FIG. 1 in which all the desulfurized fuel leaving the desulfurizer assembly 104 flows through the indicator assembly 106a of the monitoring assembly 106 before being passed to the heat exchanger 108. As discussed herein above, the indicator assembly 106a includes indicator material 204 which changes its color when exposed to sulfur-containing compounds in the fuel, and the change in the color of the indicator material and/or the rate of change in the color are directly related to the level of sulfur saturation in the indicator material and to the sulfur breakthrough concentration in the fuel. The dimensions of the indicator assembly 106a and the amount of indicator material vary depending upon type and configuration of the fuel cell and the type of fuel used in the fuel cell. For example, the indicator assembly described herein above in Example 1 is suitable for use in the monitoring assembly of FIG. 3A when the fuel cell is a 300 kW molten carbonate fuel cell operating on HD-5 propane fuel or natural gas fuel.

As shown in FIG. 3A, the monitoring assembly 106 also includes a sensor assembly 106b for detecting at least one of the color of the indicator material 204 and the change in the color of the indicator material 204. In this illustrative embodiment, the sensor assembly 106b comprises a photoelectric sensor designed for full color detection, which is capable of detecting the color of the indicator material. For example, a full color photoelectric sensor manufactured by Balluff is suitable for use in this embodiment.

As shown, the sensor assembly 106b is disposed adjacent to or near an outer sidewall of the transparent housing 202 through which the indicator material 204 is visible, such that the sensor 106b can detect the color and/or the color change of the indicator material. In other embodiments, the housing 202 is opaque, and the color change of the indicator material 204 is detected by means of transmission of light by a fiber optic cable.

As also shown, in certain embodiments, the sensor assembly 106b includes a plurality of sensors 106b disposed adjacent to or near an outer sidewall of the transparent housing 202 through which the indicator material 204 is visible and positioned at predetermined intervals along the length of the housing 202 for detecting a progression and/or a rate of progression in the color change of the indicator material 204 along the length of the indicator assembly 106a. In such embodiments, the sensor assembly 106b detects the color and/or the color change at each position along the length of the housing 202 using the plurality of sensors, and the controller 501, determines the color change progression and its rate based on the detecting by the sensors and the time elapsed between detection of a predetermined color by a first sensor and the detection of the predetermined color by another sensor. In this way, the controller 501 can determine when the predetermined concentration of sulfur-containing compounds will be present in the fuel and whether the predetermined concentration of sulfur-containing compounds will be present in the fuel within a predetermined time period.

As described herein below, in certain embodiments the monitoring assembly 106 includes an image capture device, such as a camera or a web cam, instead of the sensor assembly, for capturing images of the color of the indicator material. In such embodiments, the images captured by the image capture device are reviewed by an operator, either at the location of the monitoring assembly or remotely, and the operator determines based on the reviewed images whether the predetermined sulfur breakthrough concentration is present in the fuel.

As also shown in FIG. 3A, after the desulfurized fuel passes through the indicator assembly, it is carried by the connecting line 107 through the second flow control member 107a, which controls the flow rate of the desulfurized fuel, to the heat exchanger 108. As discussed above with respect to FIG. 1, the fuel is preheated in the heat exchanger and thereafter passed to the processing assembly and the fuel cell.

As discussed above with respect to FIG. 1, the operations of the monitoring assembly 106, the second fuel flow control member 107a and the desulfurizer assembly 104 are controlled by the controller 501. The controller 501 determines, based on the color and/or color change detected by the sensor assembly 106b and the correlation of the color with the sulfur breakthrough concentration, whether the predetermined sulfur breakthrough concentration is present in the desulfurized fuel. If the controller 501 determines that the predetermined sulfur breakthrough concentration is present in the fuel, the controller 501 performs one or more predetermined actions. The predetermined actions performed by the controller 501 when it is determined that the predetermined concentration of sulfur-containing compounds is present in the desulfurized fuel include activating a signal indicating that the desulfurizer of the desulfurizing assembly 104 needs to be replaced or regenerated and/or controlling the second fuel flow control valve 107a to inhibit or limit the flow rate of the desulfurized fuel to the fuel cell 112, so as to reduce the supply of fuel to the system and lower the power output of the system, thus placing the system's operation at lower power or in hot standby. If the desulfurizing assembly 104 includes a plurality of desulfurizers, as discussed above, such that the fuel is passed through at least one desulfurizer while at least one of the other desulfurizers is on standby, then the controller 501, upon determining that the predetermined breakthrough concentration has been reached, controls the desulfurizing assembly 104 to inhibit the flow of fuel through the operational desulfurizer and to direct the flow of fuel through at least one of the other desulfurizers in standby mode. The controller, in this case, may also activate a signal indicating that the previously operational desulfurizer needs to be replaced or regenerated.

Figure 3B:
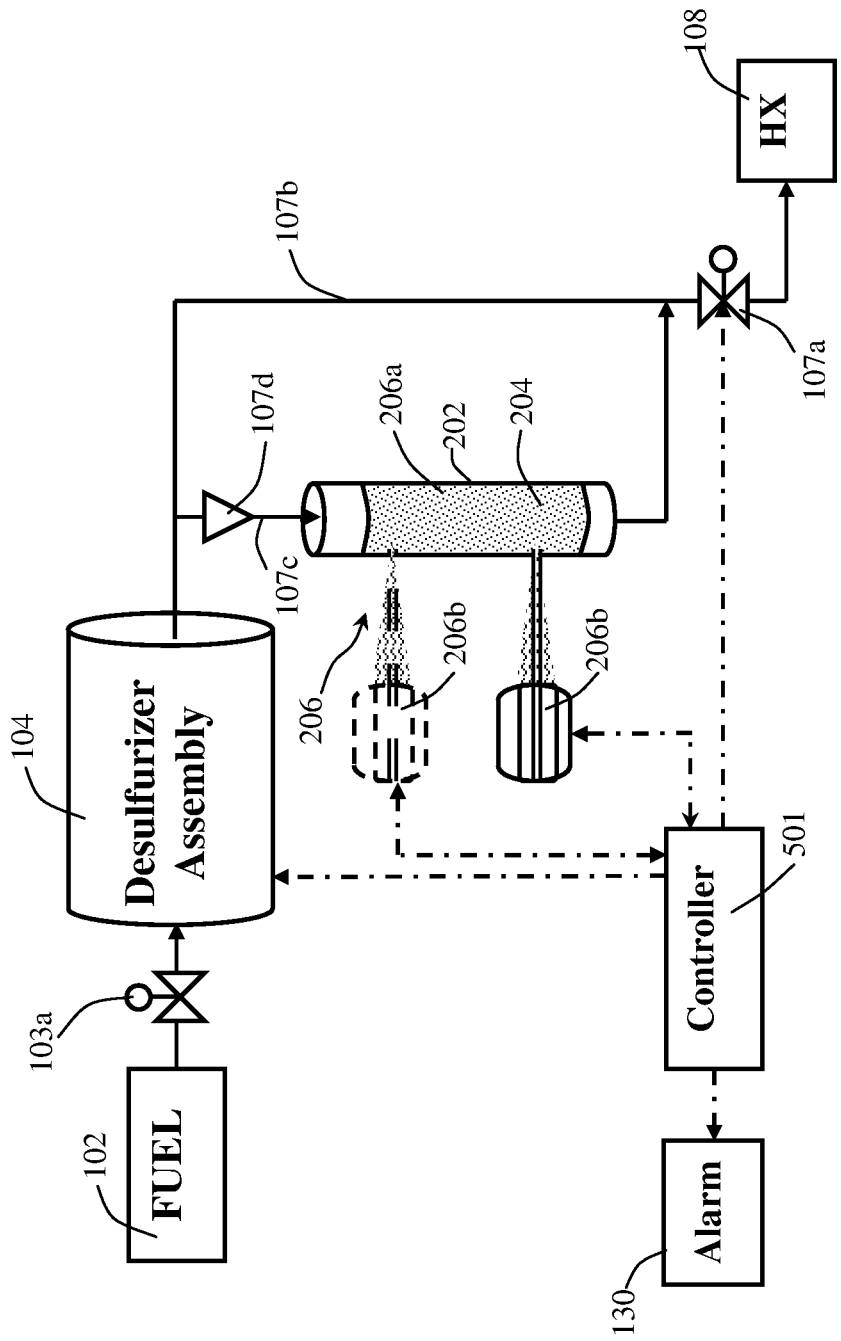
FIG. 3B shows a schematic view of another embodiment of the monitoring assembly of FIG. 2.

In another embodiment, the configuration of the fuel cell system is modified so that the indicator assembly of the monitoring assembly receives a portion of the desulfurized fuel from the desulfurizer assembly. FIG. 3B shows a schematic view of a second embodiment of the monitoring assembly 206. As shown, the desulfurized fuel leaving the desulfurizer assembly 104 is divided into a first fuel stream which is passed directly to the heat exchanger 108 via a connecting line 107b and a second fuel stream which is passed to the indicator assembly 206a of the monitoring assembly 206 via a connecting line 107c. The indicator assembly 206a can have the same configuration as the indicator assembly 106a described above in Example 2 for use in the monitoring assembly 106.

A flow control member 107d, such as a metering valve or a flow control valve, is used to control the flow of fuel to the indicator assembly 206a such that only a predetermined amount of fuel is passed to the indicator assembly 206a via the connecting line 107c at a predetermined flow rate. As shown in FIG. 3B and discussed herein above, the indicator assembly 206a includes indicator material 204 which changes its color when it is exposed to sulfur-containing compounds in the fuel. The change in the color of the indicator material 204 is correlated to the level of sulfur saturation in the indicator material and the concentration of sulfur compounds in the desulfurized fuel.

The dimensions of the indicator assembly 206a and the amount and type of indicator material vary based on configuration of the fuel cell and the type of fuel used in the fuel cell system. Since only a portion of the desulfurized fuel is being passed through the indicator assembly in this embodiment, the dimensions of the indicator assembly 206a may be much smaller than the dimensions of the assembly 106a in the first embodiment. Since the dimensions of the indicator assembly 206a combined with the partial flow rate of the fuel through the assembly affect the time it takes for the indicator material to become sufficiently saturated with the sulfur-containing compounds so as to change its color, the use of smaller sized indicator assembly 206a is particularly effective when the predetermined sulfur breakthrough concentration is very low, i.e. 50 ppb, and thus the monitoring assembly is required to be more sensitive to the presence of the sulfur-containing compounds in the desulfurized fuel.

As also shown in FIG. 3B, the monitoring assembly 206 includes a sensor assembly 206b that detects the color and/or the change in the color of the indicator material 204 in the indicator assembly 206a. As in the first embodiment, the sensor assembly 206b comprises at least one photoelectric sensor, which is capable of detecting the color and changes in the color of the indicator material, and a full color detection photoelectric sensor manufactured by Balluff is suitable for use in the sensor assembly of this embodiment. The sensor assembly 206b is disposed adjacent to or near the outer sidewall of the transparent housing 202 of the indicator assembly 206a through which the indicator material 204 is visible, such that the sensor assembly 206b is able to detect the color and/or the color change of the indicator material 204. In other embodiments, the sensor assembly 206b comprises at least one fiber optic sensor capable of calorimetrically detecting the color and/or color changes of the indicator material within the confines of a non-transparent housing 202.

In some embodiments the sensor is replaced by an image capture device, such as a camera or a web cam, which captures images of the indicator material to show the color of the indicator material. As discussed in more detail below, the images captured by the image capture device are then reviewed by an operator, either at the location of the monitoring assembly or remotely, and the operator determines based on these images whether the predetermined sulfur breakthrough concentration is present in the fuel.

As also shown, in certain embodiments, the sensor assembly 206b includes a plurality of sensors 206b disposed adjacent to or near an outer sidewall of the transparent housing 202 through which the indicator material 204 is visible and positioned at predetermined intervals along the length of the housing 202 for detecting a progression and/or a rate of progression in the color change of the indicator material 204 along the length of the indicator assembly 206a. As discussed above with respect to FIG. 3A, the sensor assembly 206b detects the color and/or the color change at each position along the length of the housing 202 using the plurality of sensors, and the controller 501 determines the color change progression and its rate based on the detection of the sensors and the time elapsed between detection of a predetermined color by one sensor and the detection of the same or other similar color change by another sensor.

As further shown in FIG. 3B, after the second stream of the desulfurized fuel passes through the indicator assembly 206a, the second stream of fuel combines with the first fuel stream in the connecting line 107b. The combined fuel stream is then passed to the heat exchanger 108 through the second fuel flow control member 107a. Although not shown for purposes of clarity and simplicity, the connecting line 107c may also include a flow transmitter or a rotometer upstream or downstream from the indicator assembly 206a to control the amount of fuel carried to the connecting line 107c by the fuel flow control member 107d.

As in the first embodiment of the monitoring assembly 106 described above with respect to FIG. 3A, the operations of the monitoring assembly 206 in the second embodiment, the second fuel flow control valve 107a and the desulfurizer assembly 104 are controlled by the controller 501 based on detection by the sensor assembly 206b. The controller 501 may also control the operation of the flow control member 107d so as to control the amount of fuel passed to the indicator assembly 206a.

As in the first embodiment, the controller 501 determines, based on the color and/or color change detected by the sensor assembly 206b and the correlation of the colors with the different sulfur breakthrough concentrations, whether the predetermined sulfur breakthrough concentration in desulfurized fuel has been reached, and if it has been, the controller performs at least one predetermined action. As discussed above, the predetermined actions performed by the controller 501 include activation of the signal, such as an alarm, indicating that the desulfurizer in the desulfurizer assembly 104 needs to be replaced or regenerated, control of the second fuel flow control valve 107a to inhibit or limit the fuel flow to the fuel cell 112, so as to put the system in a reduced power output or a hot standby mode, and, if the desulfurizing assembly 104 includes a plurality of desulfurizers, such that the fuel is passed through at least one desulfurizer while at least one of the other desulfurizers is on standby, controlling the desulfurizing assembly 104 to inhibit the flow of fuel through the operational desulfurizer and to direct the flow of fuel through at least one of the other desulfurizers in standby mode.

Although the above embodiments of the monitoring assembly 106 are described and shown as being used in a fuel cell system, it is understood that the monitoring assembly, as shown in FIGS. 2, 3A and 3B may be used in other systems and applications requiring detection of sulfur-containing compounds and their concentrations. For example, the monitoring assembly described herein above can also be used in petroleum refineries for determining whether sulfur-containing compounds are present in petroleum and/or the concentration of sulfur-containing compounds. Moreover, the application of the monitoring assembly is not limited to detection of sulfur-containing compounds and/or their concentration in fuel or petroleum and the monitoring assembly may be employed to detect sulfur-containing compounds and their concentration in other carrier mixtures. Thus, for example, the monitoring assembly described above is suitable for use in analytical laboratories and in environmental analysis, and in other multiple sulfur-related applications.

Figure 4:
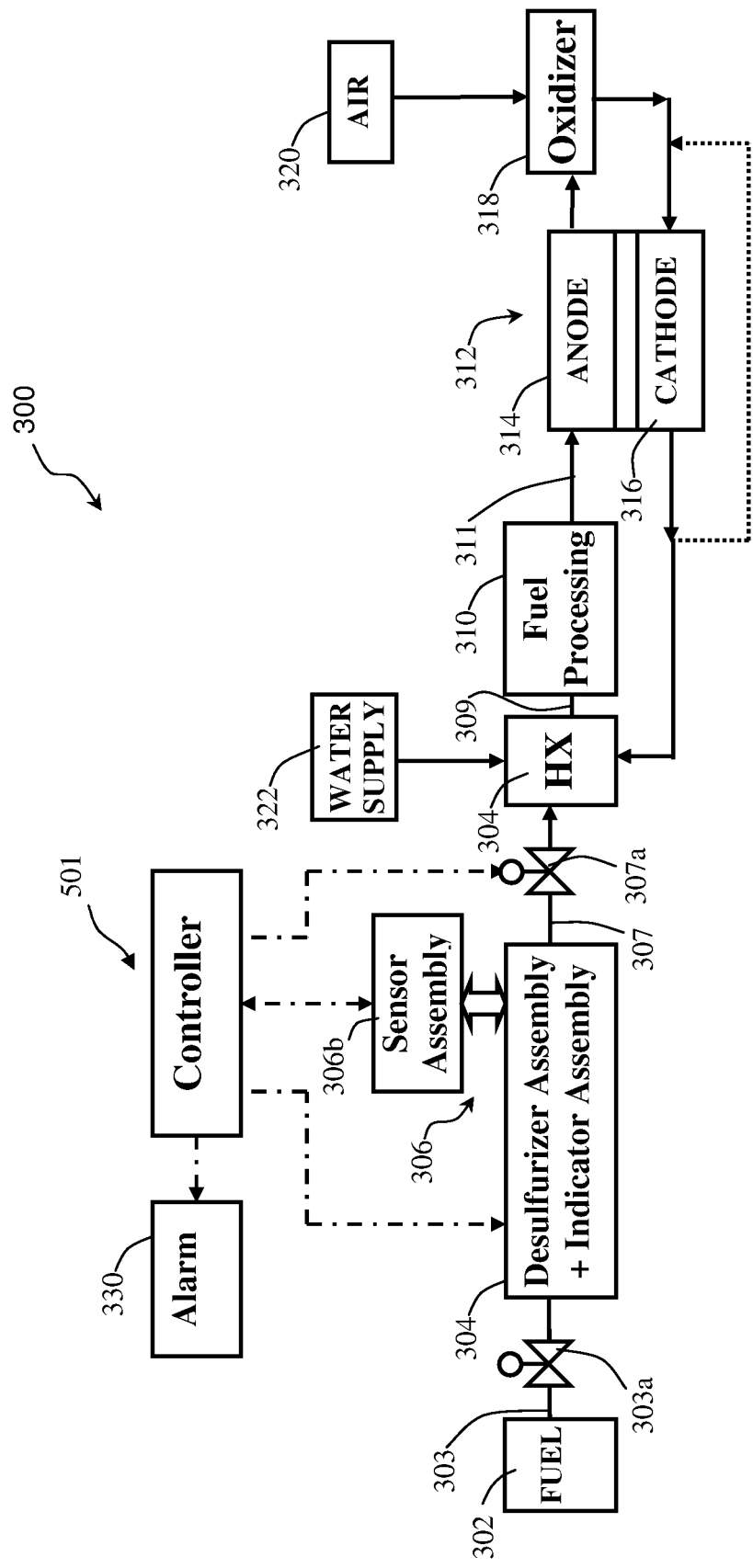
FIG. 4 shows another embodiment of the fuel cell system of FIG. 1 which includes a combined desulfurizer/indicator assembly.

The system 100 shown in FIGS. 1-3B may be further modified to combine the indicator assembly with the desulfurizing assembly. FIG. 4 shows such a modified system 300, which includes a combined desulfurizer/indicator assembly 304, a sensor assembly 306b and a controller 601. The system 300 is supplied with fuel from a fuel supply 302 connected to the desulfurizer/indicator assembly 304 by a connecting line 303. A flow control member 303a, such as a flow control valve, can be used to control the flow of fuel from the fuel supply 302 to the desulfurizer/indicator assembly 304.

The desulfurizer/indicator assembly 304 includes one or more desulfurizers each of which comprises one or more adsorbent and/or absorbent desulfurizer beds comprising adsorbent and/or absorbent materials, and one or more calorimetric beds comprising indicator material. The constructions of the desulfurizers will be described in more detail herein below. Sulfur-containing compounds present in the fuel being passed through the desulfurizer/indicator assembly 304 are removed from the fuel using the adsorbent and/or absorbent desulfurizer beds by chemical or physical adsorption or by absorption. In certain embodiments, the indicator material is used to remove the sulfur-containing compounds present in the fuel. The sensor assembly 306a monitors the fuel passing through the desulfurizer/indicator assembly 304 for the presence of sulfur-containing compounds therein, i.e. sulfur breakthrough, and detects the concentration of the sulfur-containing compounds in the fuel, i.e., sulfur breakthrough concentration.

As shown in FIG. 4, the fuel cell system 300 also includes a controller 501 for controlling at least the sensor assembly 306b and the desulfurizer/indicator assembly 304. As described above with respect to the first embodiment shown in FIG. 1, the controller 501 determines, based on the detected sulfur breakthrough and/or sulfur breakthrough concentration by the sensor assembly 306b, whether a predetermined sulfur breakthrough or sulfur breakthrough concentration is present in the fuel, and performs at least one predetermined action if it is determined that the predetermined sulfur breakthrough or sulfur breakthrough concentration has been reached. As also described herein above, one of the predetermined actions includes activating signal, such as an alarm 330, indicating a need for replacement or regeneration of at least one desulfurizer of the desulfurizer/indicator assembly 304. If the desulfurizer/indicator assembly 304 includes a plurality of desulfurizers such that at least one of the desulfurizers is in standby while another desulfurizer is operating, one of the predetermined actions performed by the controller 501 includes inhibiting the flow of fuel through the another operational desulfurizer and re-directing the flow of fuel through the one of the desulfurizers in standby mode. Finally, another one of predetermined actions includes limiting or inhibiting the flow of fuel to the fuel cell so as to limit power production or to put the system 300 into a zero power output state or hot standby mode.

In the illustrative embodiments described herein and the discussion to follow, it will be assumed that the concentration of sulfur-containing compounds in the carrier mixture is monitored by the sensor assembly 306b to detect the sulfur breakthrough concentration. However, the description and discussion to follow applies equally to the cases in which the sulfur content, or the sulfur breakthrough, is being monitored by the sensor assembly 106b. As in the system of FIG. 1, the predetermined breakthrough sulfur concentration is generally in the range of 30 ppbv to 200 ppbv.

As mentioned herein above, in certain embodiments the desulfurizer/indicator assembly 304 includes a plurality of desulfurizers including at least one desulfurizing bed and at least one indicator bed, wherein the desulfurizers are coupled with one another so as to allow at least one of the desulfurizers to be operational while one or more of the other desulfurizers is in standby mode. An example of a desulfurizer assembly which includes multiple desulfurizers arranged in a "lead lag" system, is disclosed in the commonly assigned U.S. Pat. No. 7,063,732, and may be modified to include at least one indicator bed in each of the desulfurizers. In such embodiments, the desulfurizer assembly 304 includes one or more fuel flow control members (not shown for purpose of simplicity) to direct the flow of fuel through at least one of the desulfurizers.

In these embodiments, as discussed herein above, when the controller determines, based on the sulfur breakthrough concentration detected by the sensor assembly 306b, that the predetermined sulfur breakthrough concentration is present in the fuel, the controller 501 performs the predetermined action of controlling the fuel flow control members of the desulfurizer/indicator assembly 304 to inhibit or limit the flow of fuel through the operational desulfurizer and to direct the flow of fuel through at least one of the other desulfurizers on standby. The controller 501 may also perform the predetermined action of activating a signal, such as an alarm, indicating a need for replacement or regeneration of the previously operational desulfurizer. In certain embodiments, the controller 501 further performs a predetermined action of automatically regenerating the previously operational desulfurizer by regenerating the adsorbent materials in the desulfurizer when the fuel flow through the previously operational desulfurizer is inhibited or if the signal indicating that the previously operational desulfurizer needs to be regenerated is activated.

As shown in FIG. 4, the fuel cell system 300 also includes a second fuel flow control member 307a downstream from the desulfurizer/indicator assembly 304 for controlling the flow of fuel to the fuel cell 312. In certain embodiments, the second fuel flow control member 307a is controlled by the controller 501 based on the sulfur breakthrough concentration detected by the sensor assembly 306b. In particular, when the controller 501 determines, based on the detection by the sensor assembly 306b, that the sulfur breakthrough concentration is present in the fuel, the controller 501 controls the second fuel flow control member 307a to limit or inhibit the flow of fuel through the control member 307a, so as to limit the amount of fuel provided to the fuel cell 312 and the amount of power produced by the system 300. In such embodiments, the controller 501 may control the second fuel flow control member 307a so as to bring the system's operation into a zero power or hot standby mode, when it is determined that the predetermined sulfur breakthrough concentration in the fuel has been reached.

As shown, the fuel cell system 300 also includes a heat exchanger 308 downstream from the second fuel flow control member 307a for pre-heating the desulfurized fuel, a fuel processing assembly 310 for further processing the fuel, the fuel cell 312, including an anode 314 and a cathode 316, and an oxidizer assembly 318. The desulfurized fuel, after passing through the desulfurizer/indicator assembly 304 is carried through the second fuel flow control member 307a using a connecting line 307. The desulfurized fuel passed through the second fuel flow control member 307a is conveyed to the heat exchanger 308, in which the fuel is combined with water from a water supply 322 and heated to a predetermined temperature to produce heated humidified fuel. The heated humidified fuel is then passed from the heat exchanger 308 to the fuel processing assembly 310 via a connecting line 309 to undergo further processing. In particular, the processing assembly 310 may include a deoxidizing assembly for removing trace oxygen components from the fuel and a pre-reforming assembly for reforming at least a portion of the heated humidified fuel to produce fuel suitable for use in the fuel cell 312.

Fuel processed by the processing assembly 310 is conveyed through a connecting line 311 to the anode 314 of the fuel cell 312, where it undergoes an electrochemical reaction with an oxidant gas flowing through the cathode 316 to produce electrical power. Spent fuel leaves the anode 314 as anode exhaust comprising reaction products and unreacted fuel, and is conveyed to the oxidizer 318 in which it is combined with air form an air supply 320 and combusted to produce oxidant gas suitable for use in the cathode 316. Spent oxidant gas leaves the cathode 316 as cathode exhaust and, in turn, may be passed to the heat exchanger 308 to pre-heat the desulfurized fuel and water. In some embodiments, a portion of the cathode exhaust is recycled back to the cathode 316.

Figure 5:
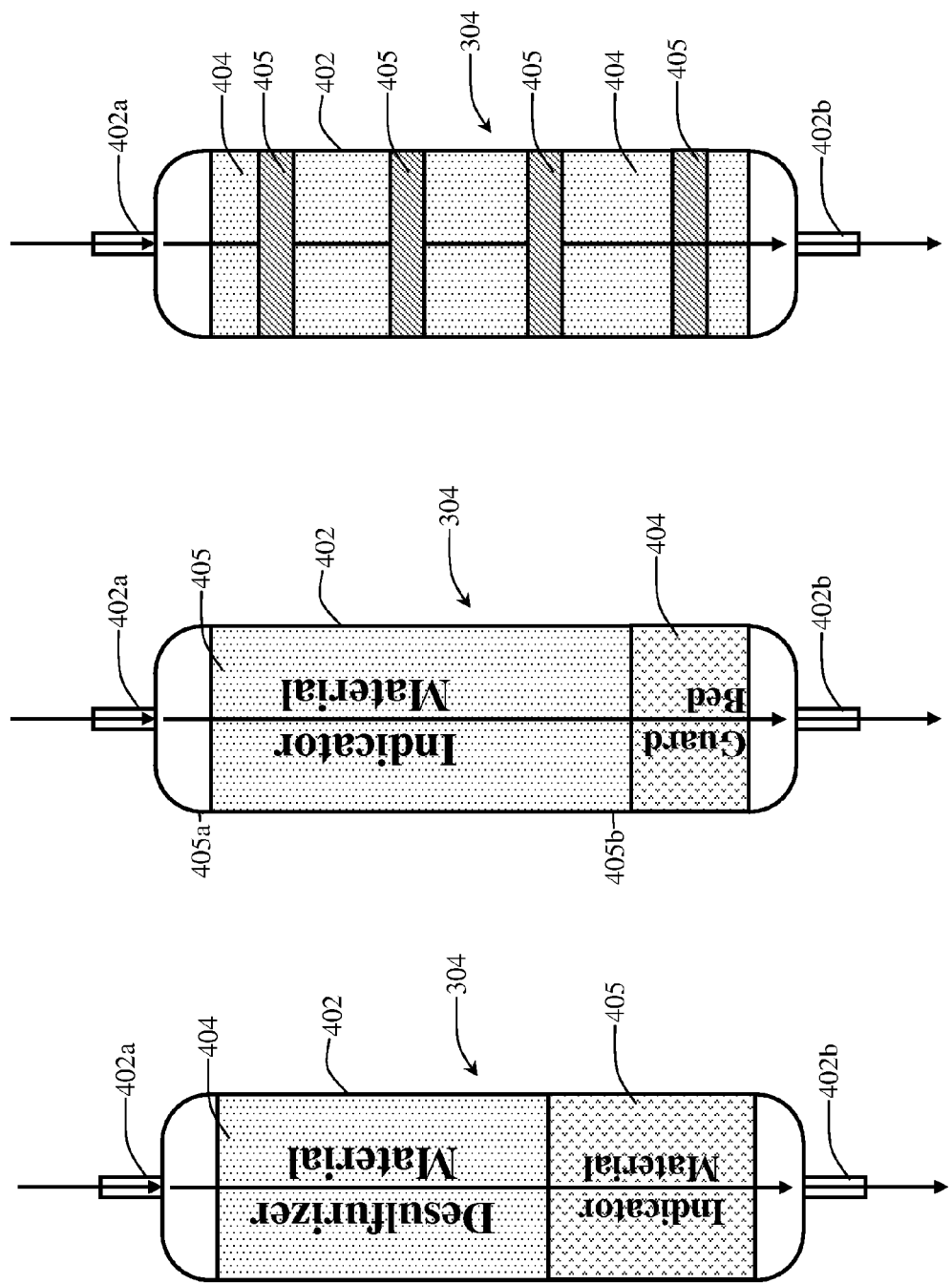
FIGS. 5A-5C show detailed schematic views of three illustrative embodiments of the desulfurizer/indicator assembly of FIG. 4.

FIGS. 5A-5C show detailed schematic views of three illustrative embodiments of the desulfurizer/indicator assembly 304 of FIG. 4. In FIG. 5A, which shows a first illustrative embodiment of the combined desulfurizer/indicator assembly 304, the assembly 304 includes a housing 402 having an inlet 402a and an outlet 402b which are adapted to allow the indicator assembly to be placed on-line in the fuel cell system 100. Typically, the inlet and outlet 402a and 402b can be female couplings adapted to mate with male couplings of the adjoining lines of the fuel cell system. The desulfurizer/indicator assembly 304 also includes a desulfurizer material 404 and an indicator material 405 comprising a colorimetric adsorbent. The desulfurizer material 404 and the indicator material 405 are both housed by the housing 402.

The housing 402 is additionally adapted to allow detection of a change in property of the indicator material 405. In particular, the housing 402 includes an access way to the indicator material 405 so as to allow the sensor assembly 306b to detect the change in one or more physical properties of the indicator material. In some illustrative embodiments, the access way comprises a transparent or a translucent window in the housing 402, such as a sight glass, to allow the indicator material 405 to be visible from outside of the housing 402. In other embodiments, the housing 402 includes an outer housing layer and a further inner housing layer that is transparent or translucent for housing the indicator material 405 so as to form an internal window or sight glass within the outer housing. In some embodiments, the housing 402 is formed from a transparent or translucent material, such as quartz, polyvinyl chloride (PVC) plastic, poly methyl methacrylate plastic or other acrylate, or polycarbonate, which allows the indicator material 405 housed therein to be visible when viewed from the outside of the housing 402.

As shown, the desulfurizer material 404 may be provided in a form of a desulfurizer bed and comprises a desulfurizer adsorbent. However, it is understood that the desulfurizer material 404 may comprise a desulfurizer absorbent material which absorbs sulfur-containing compounds in the fuel. The indicator material 405 used in the indicator assembly may be provided in a form of an indicator bed and comprises material which changes at least one of its physical properties, such as its color, when exposed to sulfur-containing compounds. In the illustrative embodiment shown, the indicator material 405 comprises a calorimetric adsorbent which changes color when exposed to sulfur-containing compounds. As discussed above with respect to FIGS. 1 and 2, suitable calorimetric adsorbents include as FSK-A adsorbent supplied by Tokyo Gas, Ag400 adsorbent supplied by Molecular C-Chem, TOSPIX 94 adsorbent supplied by Tokyo Gas, F8-01 (Desulf-2) adsorbent supplied by BASF, Selectra® Sulf-X CNG-2 adsorbent manufactured by Engelhard (recently acquired by BASF), or SulfaTrap™-R6 manufactured by TDA Research.

The change in the color of the calorimetric indicator material is indicative of and correlated to the different sulfur breakthrough concentrations in the fuel with a predetermined color corresponding to a predetermined sulfur breakthrough concentration. Thus, the sensor assembly 306b of FIG. 4 detects at least one of the color and a change in the color of the indicator material 405 and the controller 501 correlates the detected color or the detected color change with the different sulfur breakthrough concentrations and determines whether the predetermined sulfur breakthrough concentration is present in the fuel. In certain embodiments, the sensor assembly 306b includes a plurality of sensors disposed at predetermined intervals along the length of the indicator material 405 housed by the housing 402 and the controller 501 is used to determine the progression or the rate of progression of the color change, and thus the corresponding rate of progression of the sulfur breakthrough concentration.

In the first embodiment shown in FIG. 5A, the desulfurizer material 404 and the calorimetric indicator material 405 are housed by the housing 402 such that the fuel is first carried through the desulfurizer material 404 to remove sulfur-containing compounds in the fuel by chemical or physical adsorption or absorption, and is thereafter carried through the calorimetric indicator material 405 for determining whether the predetermined concentration of sulfur breakthrough is present in the fuel. In some illustrative embodiments, the calorimetric indicator material 405 comprises a colorimetric adsorbent which removes any sulfur breakthrough in the desulfurized fuel after the fuel is carried through the desulfurizer material 404. In this way, the indicator material 405 functions as a guard bed to prevent sulfur breakthrough from passing to the fuel cell.

The dimensions of the housing 402, and the volumes of the desulfurizer material 404 and the indicator material 405 vary based on the configuration of the fuel cell 312 of the system 300 and the type of fuel supplied to the system 300. In particular, the desired dimensions of the housing 402, in particular the ratio of the length to the diameter of the housing, and the volumes of the desulfurizer and indicator materials 404, 405 disposed in the housing 402 are optimized so as to eliminate channeling of the fuel through the assembly 304 and to allow fuel flow within predetermined superficial velocity and residence time ranges. As mentioned above, the predetermined superficial velocity and space velocity of the fuel flowing through the desulfurizer/indicator assembly 304 are dependent on the type of fuel used in the system 300. For example, space velocity in the range of 35 to 600 l/hr and superficial velocity in the range 0.06 to 0.9 ft/sec are desired, with a typical length to diameter (L/D) ratio of the housing being in the range of 3 to 10. These values for the desired space velocity and length to diameter ratio relate to the two adsorbent layers combined in the housing, as shown in FIGS. 5A and 5B, and to multiple adsorbent layers, as shown in FIG. 5C. The high space velocities and superficial velocities, such as 600 l/hr space velocity and 0.9 ft/sec superficial velocity can be achieved, for example, when natural gas fuel is passed at a flow rate of 43 scfm through the desulfurizer/indicator assembly 304 having an internal diameter of about 12.4 inches and a length of about 62 inches, with a cross-sectional area of 0.84 ft$^2$, a total adsorbent volume of 4.3 ft$^3$ and an L/D ratio of 5.0. The low space velocities and superficial velocities, such as 35 l/hr space velocity and 0.06 ft/sec superficial velocity, can be achieved, for example, if propane gas fuel is passed at a flow rate of 10 scfm through the desulfurizer/indicator assembly 304 having an internal diameter of about 23.1 inches and a length of about 70 inches, with a cross-sectional area of 2.9 ft$^2$, a total adsorbent volume of 17 ft$^3$ and an L/D ratio of 3.0.

FIG. 5B shows a second embodiment of the desulfurizer/indicator assembly 304 of the system 300 of FIG. 4. As in the first embodiment of FIG. 5A, the desulfurizer/indicator assembly 304 of FIG. 5B includes a housing 402 with an inlet 402a and an outlet 402b which are adapted to allow the indicator assembly to be placed on-line in the fuel cell system 300. The desulfurizer/indicator assembly 304 also includes an indicator material 405, which may be provided in a form of an indicator bed, and a desulfurizer material 404, which may be provided in a form of a desulfurizer bed. As discussed above with respect to the first embodiment, the indicator assembly is further adapted to allow detection of a property of the indicator material 405. In particular, the housing 402 either comprises transparent or translucent materials to allow the indicator material 405 to be visible therethrough, or includes an access way which allows the sensor assembly 306b to detect the change in at least one of the physical properties of the indicator material 405. The access way may comprise at least one sight glass or window in the housing to allow visibility of the indicator material 405 from outside the housing 402 or an internal sight glass or window formed by a transparent or translucent inner housing layer.

In the second embodiment shown in FIG. 5B, the indicator material 405 is disposed in the housing 402 so that fuel entering the assembly 304 through the inlet 402a is first carried through the indicator material 405. In particular, the indicator material 405 comprises the main adsorbent or absorbent material which removes sulfur-containing compounds in the fuel by physical or chemical adsorption or absorption. At the same time, the indicator material 405 changes at least one of its physical properties when it is exposed to sulfur-containing compounds. In this illustrative embodiment, the indicator material 405 comprises a calorimetric adsorbent which adsorbs sulfur-containing compounds and gradually changes its color when exposed to sulfur-containing compounds. As in the first embodiment, suitable calorimetric adsorbents include FSK-A adsorbent, Ag400 adsorbent, TOSPIX 94 adsorbent, Selectra® Sulf-X CNG-2 adsorbent, F8-01 (Desulf-2) or SulfaTrap™-R6.

The color and/or the color change of the indicator material are indicative of and are correlated to the sulfur concentrations in the fuel with a predetermined color corresponding to a predetermined sulfur concentration. Since the indicator material 405 is the main sulfur adsorbent or absorbent, the change in the color of the indicator material 405 will be greatest at a first end 405a of the indicator material near the inlet 402a of the housing, which is exposed to the highest concentrations of sulfur-containing compounds. The color change of the indicator material 405 will be smallest at a second end 405b, which is opposite the first end 405a and is furthermost relative to the inlet 402a, since most of the sulfur-containing compounds have already been removed by the indicator material 405 disposed in closer proximity to the first end 405a.

As discussed above, the sensor assembly 306b of FIG. 4 detects at least one of the color and a change in the color of the indicator material 405 and the controller 501 correlates the detected color and/or the detected color change with the concentration of sulfur-containing compounds in the fuel and determines whether the predetermined sulfur breakthrough concentration is present in the fuel. In this illustrative embodiment, it is desired that the sensor assembly 306b detect the color and/or the change in the color of the indicator material at or near the second end 405b of the indicator material since most of the sulfur-containing compounds in the fuel are removed by the indicator material 405 closer to the first end 405a, and the portion of the indicator material 405 at or near the second end 405b is exposed to desulfurized or substantially desulfurized fuel. As in the first embodiment, the sensor assembly 306b may, in some illustrative embodiments, include a plurality of sensors disposed at predetermined intervals along the length of the indicator material 405, i.e. from the first end 405a to the second end 405b, so as to enable the controller 501 to determine the progression or the rate of progression of the color change of the indicator material, and the corresponding progression or rate of progression of the sulfur breakthrough concentration in the fuel.

As shown in FIG. 5B, the desulfurizer material 404 in this embodiment is housed by the housing 402 such that the fuel is carried through the desulfurizer material 404 after being passed through the indicator material 405. In this way, the desulfurizer material 404 acts as a guard bed for removing any sulfur breakthrough in the fuel leaving the indicator material 405 to prevent sulfur-containing compounds from passing to the fuel cell. As in the first embodiment, the desulfurizer material 404 comprises a desulfurizer adsorbent or absorbent material which chemically or physically adsorbs or absorbs sulfur-containing compounds in the fuel.

As discussed herein above, the dimensions of the housing 402 and the volumes of the desulfurizer material and the indicator material 405 vary depending on the configuration of the fuel cell 312 and the type of fuel supplied to the system 300.

A third embodiment of the desulfurizer/indicator assembly 304 of the system 300 of FIG. 4 is shown in FIG. 5C. As shown, the desulfurizer/indicator assembly 304 includes a housing 402 with an inlet 402a and an outlet 402b which are adapted to allow the indicator assembly to be placed on-line in the fuel cell system 300. The assembly 304 further includes a desulfurizer material arranged in a plurality of desulfurizer beds 404 and an indicator material 405 arranged in a plurality of indicator beds 405. As in the first and second embodiments, the desulfurizer/indicator assembly is additionally adapted to allow detection of a property of the indicator material 405. In particular, the housing 402 comprises transparent or translucent materials to allow viewing of the indicator material 405 therethrough, or includes an access way which allows the sensor assembly 306b to detect the change in at least one of the physical properties of the indicator beds. In particular, in some illustrative embodiments, the housing 402 includes one or more transparent or translucent windows in the housing 402, such as one or more sight glasses, to allow the indicator beds 405 to be visible from outside of the housing 402. In other illustrative embodiments, the housing includes an outer housing layer and an inner housing layer that is transparent or translucent and that houses the indicator beds 405 so as to form one or more internal windows or sight glasses within the outer housing, which may be monitored either through the surface of the housing 402 or by means of a fiber optic cable within the housing for transmission of the color or the change in color of the indicator material 405.

As shown in FIG. 5C, the desulfurizer beds 404 and the indicator beds 405 are arranged so that adjacent desulfurizer beds 404 are separated by at least one indicator bed 405. Although FIG. 5C shows that the fuel entering the housing 402 through the inlet 402a is first passed through a first desulfurizer bed 404 before being passed through an indicator bed 405, and that before being outputted from the outlet 402b, the fuel is passed through a last desulfurizer bed 404, it is understood that the arrangements of the desulfurizer beds 404 and the indicator beds 405 may be varied. Thus, for example, the fuel entering the housing 402 may be first passed through the first indicator bed 405 before being passed through the first desulfurizer bed 404, and/or before being outputted form the outlet 402b, the fuel may be passed through a last indicator bed 405. Moreover, the number and sizes of the desulfurizer beds 404 and the indicator beds 405 are merely illustrative and may also be varied depending on the fuel supplied to the system 300 and the configuration of the system 300. It is further understood that each of the desulfurizer/indicator assemblies may include desulfurizer beds 404 and/or the indicator beds 405 having different sizes, such that, for example the desulfurizer beds 404 in closer proximity to the inlet 402a may be larger than the desulfurizer beds 404 near the outlet 402b.

Each of the desulfurizer beds 404 comprises an adsorbent or an absorbent material for chemically or physically adsorbing or absorbing sulfur-containing compounds in the fuel. Each indicator bed 405 comprises indicator material which changes at least one of its physical properties, such as its color, when exposed to sulfur-containing compounds. In the present illustrative embodiment, the indicator material is a colorimetric adsorbent which gradually changes color when exposed to sulfur-containing compounds. As in the first two embodiments, suitable colorimetric adsorbents include as FSK-A adsorbent supplied by Tokyo Gas, Ag400 adsorbent supplied by Molecular C-Chem, TOSPIX 94 adsorbent supplied by Tokyo Gas, Selectra® Sulf-X CNG-2 adsorbent manufactured by Engelhard (recently acquired by BASF), F8-01 (Desulf-2) manufactured by BASF, or SulfaTrap™-R6 manufactured by TDA Research. As mentioned above, in certain embodiments employing F8-01 (Desulf-2) adsorbent as the indicator material, the F8-01 (Desulf-2) adsorbent may be used together with a Desulf-1 adsorbent, such as F3-01 adsorbent supplied by BASF, forming the desulfurizer beds 404.

As discussed above, the change in the color of the indicator material is indicative of and correlated to the different sulfur breakthrough concentrations in the fuel with a predetermined color corresponding to a predetermined sulfur breakthrough concentration. In the embodiment of FIG. 4 employing the desulfurizer/indicator assembly shown in FIG. 5C, the sensor assembly 306b includes a plurality of sensors, with each sensor corresponding to one of the indicator beds 405, for detecting at least one of the color and a change in the color of the indicator material in each indicator bed 405. The controller 501 correlates the detected colors or the detected color changes with the different concentrations of sulfur compounds and determines, based on the detections, whether the predetermined sulfur breakthrough concentration is present in the fuel at any of the given locations. The controller 501 may also be used to determine the progression or the rate of progression of the color change, and the corresponding rate of progression of the sulfur breakthrough concentration.

It is understood that the embodiments of the combined desulfurizer/indicator assembly 304 shown in FIGS. 5A-5C are merely illustrative and that the arrangements of the desulfurizer material and the indicator material within the housing may be varied to achieve a desired operation and sulfur breakthrough detection. In addition, as mentioned above, the desulfurizer/indicator assembly 304 may include a plurality of desulfurizer units, such as the ones shown in FIGS. 5A-5C, connected in parallel in a "lead-lag" arrangement using fuel flow control members, wherein at least one of the units is in operation while at least one other unit is in a standby mode. In this way, when the controller 501 determines that the predetermined concentration of sulfur breakthrough is present in the fuel, the controller 501 controls fuel flow control members to inhibit the flow of fuel through the at least one unit that is in operation and to direct the flow of fuel through at least one other unit that is on standby.

As can be appreciated, while the detection of the change in property of the indicator materials in the indicator assemblies 106a, 206a and 304 has been shown as carried out by a sensor, it is within the contemplation of the invention that this change can also be detected by an operator of the system by viewing the indicator assembly. The operator can then perform a predetermined action, such as, for example, sounding an alarm, when the observed change is indicative of a sulfur breakthrough or breakthrough concentration. It is also within the contemplation of the invention that in the system of FIG. 3B the flow of fuel through the indicator assembly 206a can be controlled to occur at spaced intervals of time during the operation of the system 100.

Figure 6:
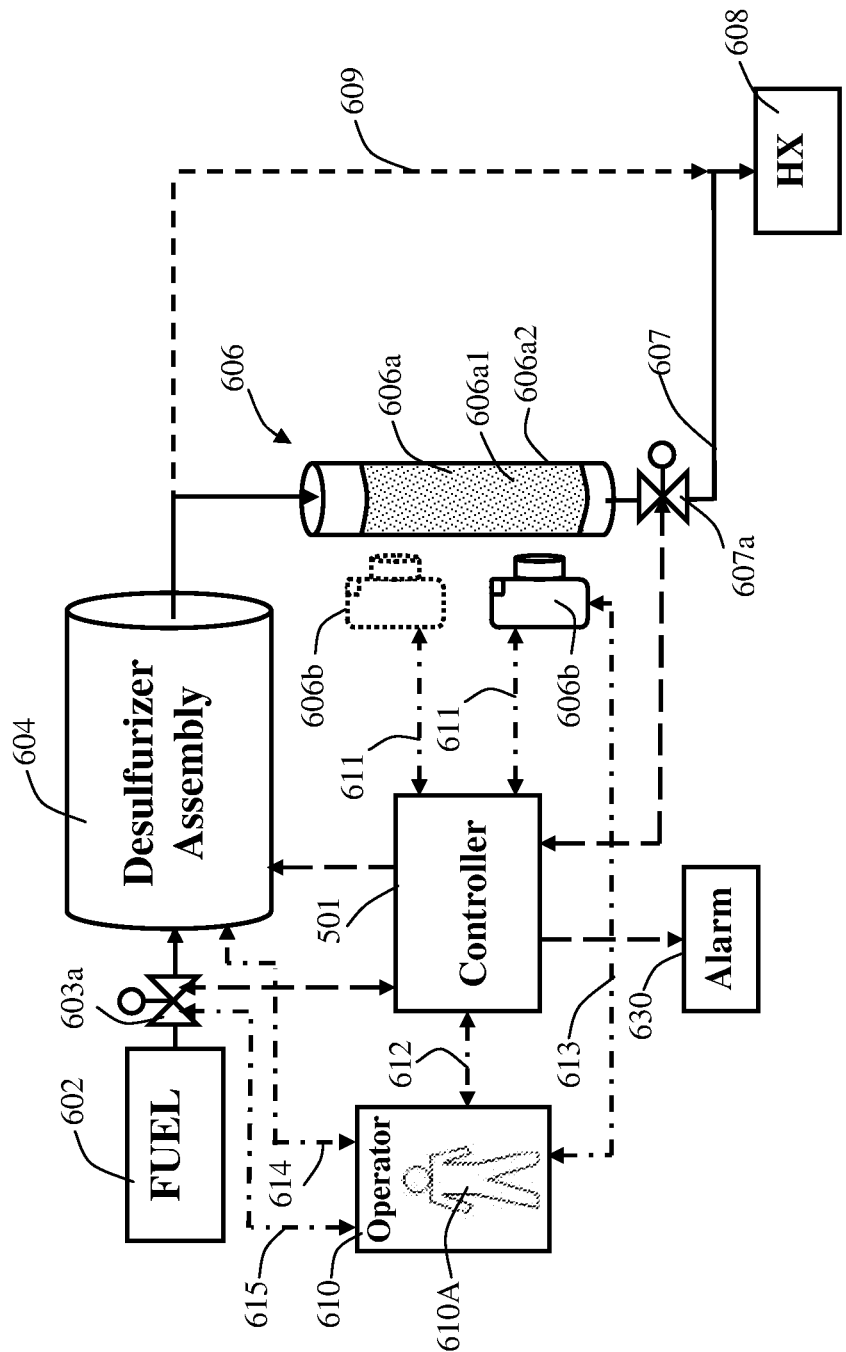
FIG. 6 shows a further embodiment of a fuel cell system employing a monitoring assembly for detecting breakthrough concentration of sulfur downstream of a desulfurizer assembly.

As mentioned herein above, the sensor assembly shown in FIGS. 3A and 3B may be replaced with an image taking device, such as a camera or a web cam, which captures images of the indicator material and relays these images to an operator 610A at an operator station 610 for review and determination whether the predetermined sulfur breakthrough concentration is present in the desulfurized fuel. FIG. 6 shows a schematic view of such an embodiment of the monitoring assembly employing the image taking device.

As shown in FIG. 6, the monitoring assembly 606 includes the indicator assembly 606a adapted to receive all or a portion of the desulfurized fuel leaving the desulfurizer assembly 604, and at least one image capture device 606b. The construction of the indicator assembly 606a is substantially the same as the constructions of the indicator assembly described herein above and shown in FIG. 2. In particular, the indicator assembly 606a includes indicator material 606a1 which changes its color when exposed to sulfur-containing compounds in the fuel, and a housing 606a2 for housing the indicator material 606a1. The housing 606a2 is transparent or includes at least one transparent sight window to allow viewing of the indicator material 606a1 housed therein by the image capture device 606b. The indicator assembly described above in example 1 or in example 2 is suitable for use in the monitoring assembly of FIG. 6.

The image capture device 606b comprises a camera or a web cam capable of capturing a color image of the indicator material and relaying the images captured to an operator at a remote location. It is desired that the image capture device is UL or CSA certified, includes a 24 VDC input and has Internet connectivity for remote viewing or accessing of the captured images. For example, Cognex Model 5100C ⅓" CCD camera with an optional integrated LED ring is a suitable image capture device for use in this embodiment.

As shown, the image capture device 606b is disposed adjacent to or near an outer sidewall of the transparent housing 606a2, or adjacent to or near the sight window in the housing, through which the indicator material 606a1 is visible such that the image capture device 606b can capture the image of the indicator material. In certain embodiments, the monitoring assembly 606 includes a plurality of image capture devices 606b disposed adjacent to or near the outer sidewall of the transparent housing 606a2 through which the indicator material 606a1 is visible and positioned at predetermined intervals along the length of the housing 606a2. The plurality of image capture devices 606b capture images of the indicator material 604 along the length of the transparent housing 606a2 so as show a progression or a rate of progression in the color change of the indicator material along the length of the housing.

As also shown in FIG. 6, after the desulfurized fuel passes through the indicator assembly, it is carried by the connecting line 607 through the second flow control member 607a which controls the flow rate of the desulfurized fuel to the heat exchanger 608. In an alternative embodiment, a first portion of the desulfurized fuel is passed through the indicator assembly, while the remaining desulfurized fuel portion flows through connecting line 609. After passing through the indicator assembly, the first portion of the desulfurized fuel is carried by the connecting line 607 through the second flow control member 607a and then re-combined with the remaining desulfurized fuel portion in line 609. The combined desulfurized fuel is then carried to the heat exchanger 608. As discussed herein above, the desulfurized fuel is preheated in the heat exchanger 608 and thereafter passed to the processing assembly and the fuel cell. The operations of the monitoring assembly 606, the fuel flow control member 603a and the desulfurizer assembly 604 are controlled by the controller 501 and by the operator 610A via the operator station 610. The controller 501 is in communication with the image capture device 606b using any suitable conventional communication means 611, such as a direct connection, a wireless network, a secure internet or intranet connection, or any other suitable network. The operator 610A via the operator station 610 is also in communication with the controller 501 and/or the image capture device 606b via a conventional communication means 612. For example, if the operator station 610 is at a remote location, the operator 610A may be in communication with the controller 501 and with the image capture device 606b through a secure internet or intranet connection, such that the operator 610 can be connected with the image capture device 606b by dialing the IP address of the device at the operator station. Also, as shown in FIG. 6, the operator 610A via the operator station 610 and communication means 613 may be in direct communication with the image capture device 606b. Additionally, the operator 610A via the operator station 610 and the communication means 614 and 615 may be in direct communication with the desulfurizer assembly 604 and the flow control member 603a, so as to allow the operator 610 to control these components directly.

In particular, the image capture device 606b is controlled directly or through the controller 501 to capture images of the indicator material at predetermined times. In the present illustrative embodiment, the image capture device 606b is controlled to capture at least one image of the indicator material at predetermined times determined based on the amount of desulfurized fuel passed through the indicator assembly 606a, such that the image capture device 606b captures at least one image of the indicator material at predetermined amounts of desulfurized fuel. The amount of fuel passed through the indicator assembly 606a may be measured using a flow meter as part of the second fuel flow control member 607a. In other embodiments, the controller 501 controls the at least one image capture device 606b to capture at least one image of the indicator material at predetermined time intervals.

After the image capture device 606b captures at least one image of the indicator material 604, the at least one image of the indicator material is conveyed either directly or through the controller 501 to the operator station 610 for the operator 610A to review. In some embodiments, the controller 501 also activates an alarm when the at least one image is relayed by the controller to the operator station 610 to notify the operator that the at least one image has been conveyed and to request the operator 610 to review the at least one image. In certain embodiments, when the image capture device 606b captures the at least one image of the indicator material 606a1, the images are stored on a storage medium (not shown for purposes of simplicity and clarity), which is internal or external to the image capture device 606b, and the controller 501 activates an alarm to alert the operator 610A that the images are ready for the operator's review and can be accessed by the operator 610A on the storage medium. It is understood that the operator may be located in the vicinity of the monitoring assembly or at a remote location, and that the images captured by the image capture device may be conveyed to the operator 610A at the operator station 610, or can be accessed and reviewed by the operator from the operator station 610.

After receiving or accessing the captured images, the operator 610A reviews the images and determines, based on the color and/or the color change of the indicator material shown in the images and the correlation of the color with the sulfur breakthrough concentration, whether the predetermined sulfur breakthrough concentration is present in the desulfurized fuel. If the operator 610A determines that the predetermined sulfur breakthrough concentration is present in the fuel, the operator 610A via the operator station instructs the controller 501 to perform one or more predetermined functions. In some embodiments, the operator 610A, upon determining that the predetermined sulfur breakthrough concentration is present in the desulfurized fuel, may activate performance of one or more predetermined functions directly rather than through the controller 501 via the communication means 614 and 615.

When the operator 610A determines that the predetermined concentration of sulfur containing compounds is present in the desulfurized fuel, the predetermined actions performed by the controller 501, or activated directly by the operator 610A, include activating a signal indicating that the desulfurizer assembly 604 needs to be replaced or regenerated and/or controlling the fuel flow control valve 603a to inhibit or limit the flow rate of the fuel to the fuel cell 112 so as to reduce the supply of fuel to the system and lower the power output of the system, thus placing the system's operation at a lower power or in hot standby.

If the desulfurizer assembly 604 includes a plurality of desulfurizers, as discussed above, such that the fuel is passed through at least one desulfurizer while at least one of the other desulfurizers is on standby, then the controller 501 controls, upon receiving the instruction from the operator 610A, or the operator 610A directly controls, the desulfurizer assembly 604 to inhibit the flow of fuel through the operational desulfurizer and to direct the flow of fuel through the at least one of the other desulfurizers in standby mode. In this case, the controller 501 or the operator 610A may also activate a signal indicating that the previously operational desulfurizer needs to be replaced or regenerated.

It should be noted that the controller 501 used in the embodiments of FIGS. 1, 3A, 3B, 4 and 6 can be a conventional PLC (programmable logic controller—essentially highly reliable robust computer) made by GE Fanuc. The control program used for the embodiments, in turn, can be a software product called "Versapro" again a GE Fanuc product implementable in GE Fanuc PLCs for industrial automation.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention. For example, the monitoring assembly may include a plurality of indicator assemblies connected in parallel and/or in series with corresponding sensor assemblies to achieve a more precise determination of the sulfur breakthrough concentration and to increase the reliability of the monitoring assembly. In such arrangements, the accuracy in the determination of the sulfur breakthrough concentration may be further improved by using different indicator materials in different indicator assemblies of the monitoring assembly. Various other modifications of the monitoring assembly construction of the invention may be made to optimize the number and arrangement of the indicator assemblies within the monitoring assembly. Moreover, other indicator materials may be used in the indicator assemblies of the invention in lieu of those discussed above.

What is claimed is:

1. A fuel cell system comprising:
 a fuel cell including an anode and a cathode, said anode being adapted to receive fuel and said cathode being adapted to receive oxidant gas;
 a controller for controlling one or more components of said fuel cell system;
 a monitoring assembly for detecting sulfur-containing compounds in said fuel after said fuel is passed through a desulfurizer assembly,
 wherein said monitoring assembly comprises an indicator assembly for passing said fuel therethrough, said indicator assembly including a housing and a bed of indicator material in powder or bead form disposed in the housing, wherein the bed of indicator material has a predetermined length and the housing is situated on-line in one of a main path receiving substantially all the fuel and a bypass path receiving only a portion of the fuel in the fuel cell system such that the monitoring assembly continuously detects changes in the sulfur concentration in the fuel as the fuel is conveyed through the indicator assembly, and the indicator material is such that at least one physical property of the indicator material changes when the indicator material is exposed to sulfur-containing compounds in the fuel of the fuel cell system, and the indicator assembly being additionally adapted to allow detection of the change in the physical property of the indicator material;
 wherein:
 the at least one physical property of the indicator material includes a color of the indicator material and a predetermined concentration of the sulfur-containing compounds corresponds to a predetermined color of the indicator material;
 the monitoring assembly further includes a sensor assembly for detecting a rate of the color change along the predetermined length of the bed of indicator material;
 the controller is programmed to estimate when the predetermined concentration of sulfur containing compounds will be present in the fuel based on the detected rate of the color change along the predetermined length of the bed of the indicator material; and
the fuel cell system further comprises a fuel flow control member for controlling the flow of fuel to the indicator assembly separately from a fuel flow control member to the desulfurizer assembly, so that the desulfurized fuel is conveyed through the indicator assembly at a predetermined flow rate.

2. A fuel cell system in accordance with claim 1, further comprising:
the desulfurizer assembly adapted to receive fuel from a fuel supply and for removing sulfur-containing compounds from said fuel to produce fuel for the anode of said fuel cell.

3. A fuel cell system in accordance with claim 2, wherein said indicator material comprises one of a silver promoted zeolite adsorbent, a zeolite adsorbent, a molybdenum oxide on alumina adsorbent, a copper oxide on alumina adsorbent and a copper promoted zeolite adsorbent.

4. A fuel cell system in accordance with claim 2, wherein:
at least a portion of said housing is transparent; and
said sensor assembly comprises at least one color detecting photoelectric sensor, said sensor assembly being adapted to detect at least one of said color of said indicator assembly and a change in said color of said indicator material.

5. A fuel cell system in accordance with claim 2, wherein:
said housing is opaque; and
said sensor assembly comprises at least one fiber optic sensor, said sensor assembly being adapted to detect at least one of said color of said indicator assembly and a change in said color of said indicator material.

6. A fuel cell system in accordance with claim 4, wherein said indicator material comprises one of a silver promoted zeolite adsorbent, a zeolite adsorbent, a molybdenum oxide on alumina adsorbent, a copper oxide on alumina adsorbent and a copper promoted zeolite adsorbent.

7. A fuel cell system in accordance with claim 6, wherein:
said indicator assembly is adapted to receive a portion of said desulfurized fuel from said desulfurizer assembly;
said housing of said indicator assembly comprises a transparent quartz material and has a diameter between 0.25 and 1.5 inches;
said indicator material comprises at least one of a silver promoted zeolite adsorbent, a copper oxide on alumina adsorbent, a molybdenum oxide on alumina adsorbent and a copper promoted zeolite adsorbent and has a volume between 5 and 300 mL disposed in said housing;
said monitoring assembly further comprising at least one of non-reactive support screen and non-reactive support material disposed in said housing adjacent an inlet of said housing and adjacent an outlet of said housing, said indicator material being retained within said housing by said at least one of non-reactive support screen and non-reactive support material.

8. A fuel cell system in accordance with claim 6, wherein:
said predetermined concentration of sulfur-containing compounds in said fuel is 30 ppbv or greater.

9. A fuel cell system in accordance with claim 2, wherein:
said controller controls said monitoring assembly and said desulfurizer assembly.

10. A fuel cell system in accordance with claim 2, wherein:
said monitoring assembly further comprises a sensor assembly for at least one of detecting said at least one physical property of said indicator material and detecting a change in at least one physical property of said indicator material, and wherein the controller determines, based on said detecting by said sensor assembly, whether a predetermined concentration of sulfur-containing compounds is present in said fuel and performs a predetermined action if said predetermined concentration of sulfur-containing compounds is present in said fuel.

11. A fuel cell system in accordance with claim 10, wherein said predetermined action performed by said controller comprises activating an alarm.

12. A fuel cell system in accordance with claim 9, wherein said fuel cell system further comprises a fuel supply control member downstream from said monitoring assembly for controlling flow of said fuel to said fuel cell, and wherein said controller performs a predetermined action comprising at least one of activating an alarm and controlling said fuel supply control member to inhibit or limit the flow of fuel to said fuel cell.

13. A fuel cell system in accordance with claim 12, wherein said desulfurizer assembly comprises at least a first desulfurizer and a second desulfurizer, said first desulfurizer being coupled with said second desulfurizer in parallel, and a plurality of fuel flow control members controlling the flow of fuel through said first and second desulfurizers such that the fuel passes through one of said first and second desulfurizers while the other of said first and second desulfurizers is in standby mode, and wherein, if it is determined that said predetermined concentration of sulfur containing compounds is present in said fuel leaving said one of said first and second desulfurizers, said predetermined action performed by said controller comprises at least one of activating an alarm and controlling said plurality of said fuel flow control members to inhibit the flow of fuel through said one of said first and second desulfurizers and to pass said fuel through the other of said first and second desulfurizers of said desulfurizer assembly.

14. A fuel cell system in accordance with claim 2, wherein said fuel cell system further comprises a fuel supply control member downstream from said monitoring assembly for controlling flow of said fuel to said fuel cell, and wherein said controller performs a predetermined action comprising at least one of:
activating an alarm;
controlling said fuel supply control member to inhibit or limit the flow of fuel to said fuel cell; and
controlling said plurality of said fuel flow control members to inhibit the flow of fuel through said one of said first and second desulfurizers and to pass said fuel through the other of said first and second desulfurizers of said desulfurizer assembly.

15. A fuel cell system in accordance with claim 2, wherein said predetermined concentration of sulfur-containing compounds in said fuel is 30 ppbv or greater.

16. A fuel cell system in accordance with claim 2, wherein said monitoring assembly further comprises:
a plurality of indicator assemblies for passing said fuel through at least one of said indicator assemblies, each of said plurality of indicator assemblies including a housing and a bed of indicator material disposed in the housing, wherein the housing of each indicator assembly is on-line in one of a main path receiving substantially all the fuel and a bypass path receiving only a portion of the fuel in the in the fuel cell system and the indicator material in the housing of each indicator assembly is such that when on-line in the fuel cell system at least one physical property of the indicator material changes when the indicator material is exposed to sulfur-containing compounds in the fuel of the fuel cell system, and each indicator assembly being additionally adapted to allow detection of the change in the physical property of the indicator material;

a plurality of sensor assemblies corresponding to said plurality of indicator assemblies for at least one of detecting said at least one physical property of said indicator material of the respective indicator assembly and detecting a change in said at least one physical property of said indicator material of the respective indicator assembly, and wherein the controller determines, based on said detecting by one or more of said sensor assemblies, whether a predetermined concentration of sulfur-containing compounds is present in said fuel and performs a predetermined action if said predetermined concentration of sulfur-containing compounds is present in said fuel.

17. A fuel cell system in accordance with claim 16, wherein one of said plurality of indicator assemblies is at least one of coupled with another of said plurality of indicator assemblies in series such that said fuel is first passed through said one of said plurality of indicator assemblies and thereafter through said another of said plurality of indicator assemblies, and coupled with another of said plurality of indicator assemblies in parallel such that said fuel is passed through said one of said plurality of indicator assemblies concurrently with being passed through said another of said plurality of indicator assemblies.

18. A fuel cell system in accordance with claim 16, wherein:
the housing of each monitoring assembly comprises one or more of: transparent or translucent materials to allow the indicator material of the monitoring assembly to be visible therethrough; an access way which allows one of a sensor assembly and a human operator to detect the change in at least one of the physical properties of the indicator material of the monitoring assembly, said access way comprising at least one of a sight glass or window in the housing to allow visibility of the indicator material of the monitoring assembly from outside the housing and an internal sight glass or window formed by a transparent or translucent inner housing layer.

19. A fuel cell system in accordance with claim 2, wherein:
said housing comprises one or more of: transparent or translucent materials to allow the indicator material to be visible therethrough; an access way which allows one of a sensor assembly and a human operator to detect the change in at least one of the physical properties of the indicator material, said access way comprising at least one of a sight glass or window in the housing to allow visibility of the indicator material from outside the housing and an internal sight glass or window formed by a transparent or translucent inner housing layer.

20. A method of monitoring sulfur-containing compounds in fuel for use in a fuel cell system, comprising the steps of: passing said fuel through a bed of an indicator material in bead or powder form after said fuel is passed through a desulfurizer assembly, said bed of indicator material having a predetermined length and being housed by a housing situated on-line in one of a main path receiving substantially all the fuel and a bypass path receiving only a portion of the fuel in said fuel cell system, wherein at least one physical property of said indicator material changes when said indicator material is exposed to sulfur-containing compounds and said housing being adapted to allow detection of the change in the physical property of the indicator material;

determining, based on a change in said at least one physical property of said indicator material, whether a predetermined concentration of sulfur-containing compounds is present in said fuel, wherein the determination is made continuously as the fuel is conveyed through the indicator material;

controlling the flow of fuel to the indicator material, separately from a fuel flow control to the desulfurizer assembly, so that the desulfurized fuel is conveyed through the indicator material at a predetermined flow rate;

wherein the at least one physical property includes a color of the indicator material and the predetermined concentration of sulfur-containing compounds corresponds to a predetermined color of the indicator material, and wherein the determining comprises detecting a rate of the color change along the predetermined length of the bed of indicator material using a sensor assembly and estimating, based on the detected rate of the color change along the predetermined length of the bed indicator material, when a predetermined concentration of sulfur-containing compounds will be present in the fuel.

21. A method in accordance with claim 20, wherein:
said detection and determining are performed by the sensor assembly and a controller responsive to the sensor assembly.

22. A method in accordance with claim 21, further comprising:
performing a predetermined action if it is determined that said predetermined concentration of sulfur-containing compounds is present in said fuel.

23. A method in accordance with claim 22, wherein: said predetermined action comprises activating an alarm.

24. A method in accordance with claim 22, wherein said fuel cell system includes a fuel supply control member downstream from said indicator material for controlling flow of said fuel to a fuel cell, and wherein said predetermined action comprises at least one of activating an alarm and controlling said fuel supply control member to inhibit or limit the flow of fuel to said fuel cell.

25. A method in accordance with claim 22, further comprising passing said fuel through a desulfurizer assembly adapted to remove sulfur-containing compounds from said fuel before passing said fuel through said indicator material, wherein:
said desulfurizer assembly comprises at least a first desulfurizer and a second desulfurizer, said first desulfurizer being coupled with said second desulfurizer in parallel, and a plurality of fuel flow control members controlling the flow of fuel through said first and second desulfurizers such that the fuel passes through one of said first and second desulfurizers while the other of said first and second desulfurizers is in standby mode, and wherein, if it is determined in said determination step that said predetermined concentration of sulfur-containing compounds is present in said fuel leaving said one of said first and second desulfurizers, said predetermined action performed comprises at least one of activating an alarm and controlling said plurality of said fuel flow control members to inhibit the flow of fuel through said one of said first and second desulfurizers and to pass said fuel through the other of said first and second desulfurizers of said desulfurizer assembly.

26. A method in accordance with claim 20, wherein at least a portion of said housing is transparent.

27. A method in accordance with claim 26, wherein said indicator material comprises one of a silver promoted zeolite adsorbent, a zeolite adsorbent, a copper oxide on alumina adsorbent, a molybdenum oxide on alumina adsorbent and a copper promoted zeolite adsorbent.

28. A method in accordance with claim 20, further comprising a step of detecting at least one physical property of said indicator material and a change in said at least one physical property of said indicator material using at least one sensor assembly, wherein said determining whether said predetermined concentration of sulfur-containing compounds is present in said fuel is performed based on said detecting.

29. A method in accordance with claim 28, wherein said sensor assembly comprises a plurality of sensors disposed along a length of said indicator material, said method further comprising determining a rate of progression of a concentration of sulfur-containing compounds along said length of said indicator material and determining, based on said rate of progression, whether said predetermined concentration of sulfur-containing compounds will be present in said fuel within a predetermined time period.

30. A method in accordance with claim 20, further comprising passing said fuel through a desulfurizer material adapted to remove sulfur-containing compounds from said fuel.

31. A method in accordance with claim 20, further comprising removing said sulfur-containing compounds from said fuel using said indicator material.

32. A method in accordance with claim 20, wherein said predetermined concentration of sulfur-containing compounds is 30 ppbv or greater.

33. A method in accordance with claim 20, wherein:
said housing comprises one or more of: transparent or translucent materials to allow the indicator material to be visible therethrough; an access way which allows one of a sensor assembly and a human operator to detect the change in at least one of the physical properties of the indicator material, said access way comprising at least one of a sight glass or window in the housing to allow visibility of the indicator material from outside the housing and an internal sight glass or window formed by a transparent or translucent inner housing layer.

* * * * *